United States Patent
Hoffman et al.

(10) Patent No.: US 8,831,984 B2
(45) Date of Patent: Sep. 9, 2014

(54) SYSTEM AND METHOD FOR INVENTORY MANAGEMENT USING MOBILE DRIVE UNITS

(75) Inventors: Andrew E. Hoffman, Lunenburg, MA (US); Michael C. Mountz, Lexington, MA (US); Michael T. Barbehenn, Bedford, MA (US); James R. Allard, Newton, MA (US); Matthew E. Kimmel, Cambridge, MA (US); Fabrizio Santini, Jamaica Plain, MA (US); Michael H. Decker, Concord, MA (US); Raffaello D'Andrea, Zurich (CH); Peter R. Wurman, Acton, MA (US)

(73) Assignee: Amazon Technologies, Inc., Reno, NV (US)

( * ) Notice: Subject to any disclaimer, the term of this patent is extended or adjusted under 35 U.S.C. 154(b) by 338 days.

(21) Appl. No.: 13/276,990

(22) Filed: Oct. 19, 2011

(65) Prior Publication Data

US 2013/0103552 A1   Apr. 25, 2013

(51) Int. Cl.
*G06Q 10/00* (2012.01)
*G01C 21/00* (2006.01)

(52) U.S. Cl.
CPC ................................. *G06Q 10/00* (2013.01)
USPC ............................................ 705/28; 701/410

(58) Field of Classification Search
None
See application file for complete search history.

(56) References Cited

U.S. PATENT DOCUMENTS

| | | | | |
|---|---|---|---|---|
| 5,928,294 A * | 7/1999 | Zelinkovsky | .................. | 701/24 |
| 6,341,271 B1 * | 1/2002 | Salvo et al. | ..................... | 705/28 |
| 6,652,213 B1 * | 11/2003 | Mitchell et al. | ............... | 414/284 |
| 6,669,089 B2 * | 12/2003 | Cybulski et al. | ............... | 235/385 |
| 6,748,292 B2 * | 6/2004 | Mountz | ......................... | 700/214 |
| 6,895,301 B2 * | 5/2005 | Mountz | ......................... | 700/215 |
| 6,950,722 B2 | 9/2005 | Mountz | | |
| 7,123,988 B2 * | 10/2006 | Russell et al. | ................ | 700/217 |
| 7,402,018 B2 | 7/2008 | Mountz et al. | | |
| 7,734,507 B2 * | 6/2010 | Ritter | ........................... | 705/26.9 |
| 7,826,919 B2 * | 11/2010 | D'Andrea et al. | ........... | 700/214 |
| 7,850,413 B2 | 12/2010 | Fontana | | |
| 7,873,469 B2 * | 1/2011 | D'Andrea et al. | ........... | 701/410 |
| 7,873,496 B2 | 1/2011 | Gajic | | |
| 7,894,932 B2 * | 2/2011 | Mountz et al. | ................ | 700/214 |
| 7,894,933 B2 * | 2/2011 | Mountz et al. | ................ | 700/214 |
| 7,912,574 B2 * | 3/2011 | Wurman et al. | ............... | 700/213 |
| 7,920,962 B2 * | 4/2011 | D'Andrea et al. | ........... | 701/410 |
| 8,068,978 B2 * | 11/2011 | D'Andrea et al. | ........... | 701/414 |
| 8,170,711 B2 | 5/2012 | D'Andrea et al. | | |
| 8,220,710 B2 * | 7/2012 | Hoffman et al. | .............. | 235/385 |
| 8,239,291 B2 | 8/2012 | Hoffman et al. | | |
| 8,265,873 B2 * | 9/2012 | D'Andrea et al. | ........... | 701/527 |
| 8,280,546 B2 * | 10/2012 | D'Andrea et al. | ........... | 700/214 |
| 8,280,547 B2 * | 10/2012 | D'Andrea et al. | ........... | 700/214 |

(Continued)

OTHER PUBLICATIONS

Trebilcock, Bob; "*Office Depot's: Flexible Automation*;" Modern Materials Handling; pp. 20-23, Aug. 2010.

(Continued)

*Primary Examiner* — Mussa A Shaawat
(74) *Attorney, Agent, or Firm* — Baker Botts L.L.P.

(57) ABSTRACT

A method for inventory management includes deploying a first mobile drive unit having first dimensions and deploying a second mobile drive unit having second dimensions, the first and second dimensions being different. The first and second mobile drive units are operable to transport inventory items to a plurality of inventory stations in the same workspace.

42 Claims, 6 Drawing Sheets

(56) References Cited

U.S. PATENT DOCUMENTS

| | | |
|---|---|---|
| 8,311,902 B2 | 11/2012 | Mountz et al. |
| 8,412,400 B2 * | 4/2013 | D'Andrea et al. ............... 701/23 |
| 8,444,369 B2 | 5/2013 | Watt et al. |
| 8,483,869 B2 * | 7/2013 | Wurman et al. ............... 700/216 |
| 8,538,692 B2 * | 9/2013 | Wurman et al. ............... 701/532 |
| 8,606,392 B2 | 12/2013 | Wurman et al. |
| 2003/0218307 A1 * | 11/2003 | Anderson et al. ............ 280/79.2 |
| 2004/0010337 A1 * | 1/2004 | Mountz ........................ 700/214 |
| 2004/0153187 A1 * | 8/2004 | Knight et al. .................... 700/99 |
| 2006/0079247 A1 * | 4/2006 | Ritter ........................ 455/456.1 |
| 2006/0089787 A1 * | 4/2006 | Burr et al. ..................... 701/202 |
| 2006/0235557 A1 * | 10/2006 | Knight et al. ................. 700/103 |
| 2007/0017984 A1 * | 1/2007 | Mountz et al. ................. 235/385 |
| 2007/0021863 A1 * | 1/2007 | Mountz et al. ................. 700/214 |
| 2007/0021864 A1 * | 1/2007 | Mountz et al. ................. 700/216 |
| 2007/0136152 A1 * | 6/2007 | Dunsker et al. ................. 705/28 |
| 2007/0198174 A1 * | 8/2007 | Williams et al. .............. 701/202 |
| 2007/0288123 A1 * | 12/2007 | D'Andrea et al. ............ 700/214 |
| 2007/0290040 A1 * | 12/2007 | Wurman et al. ............... 235/385 |
| 2007/0293978 A1 * | 12/2007 | Wurman et al. ............... 700/213 |
| 2007/0294029 A1 * | 12/2007 | D'Andrea et al. ............ 701/209 |
| 2008/0001372 A1 * | 1/2008 | Hoffman et al. ................. 280/35 |
| 2008/0009965 A1 * | 1/2008 | Bruemmer et al. ........... 700/245 |
| 2008/0051984 A1 * | 2/2008 | Wurman et al. ............... 701/200 |
| 2008/0051985 A1 * | 2/2008 | D'Andrea et al. ............ 701/200 |
| 2009/0185884 A1 * | 7/2009 | Wurman et al. ............... 414/270 |
| 2011/0060449 A1 * | 3/2011 | Wurman et al. ............... 700/218 |
| 2011/0112758 A1 * | 5/2011 | D'Andrea et al. ............ 701/201 |
| 2011/0130954 A1 * | 6/2011 | D'Andrea et al. ............ 701/200 |
| 2011/0153063 A1 | 6/2011 | Wurman et al. |
| 2012/0041677 A1 * | 2/2012 | D'Andrea et al. ............ 701/527 |
| 2012/0143427 A1 * | 6/2012 | Hoffman et al. ................. 701/23 |
| 2012/0282070 A1 | 11/2012 | D'Andrea et al. |
| 2013/0054005 A1 | 2/2013 | Stevens et al. |
| 2013/0103185 A1 * | 4/2013 | Wurman et al. ............... 700/216 |
| 2013/0103552 A1 * | 4/2013 | Hoffman et al. ................. 705/28 |
| 2013/0173049 A1 | 7/2013 | Brunner et al. |
| 2013/0204429 A1 * | 8/2013 | D'Andrea et al. ............ 700/214 |
| 2013/0204480 A1 * | 8/2013 | D'Andrea et al. ............ 701/25 |
| 2013/0246229 A1 * | 9/2013 | Mountz et al. .................. 705/28 |
| 2013/0302132 A1 | 11/2013 | D'Andrea |

OTHER PUBLICATIONS

Trebilcock, Bob; "*Putting Robotics to Work;*" Modern Materials Handling; pp. 24-25, Aug. 2010.

Office Depot press release; "*Office Depot Officially Opens Company's New State-of-the-Art Combination Warehouse;*" 4 pages, Jul. 29, 2010.

* cited by examiner

SYSTEM AND METHOD FOR INVENTORY MANAGEMENT USING MOBILE DRIVE UNITS

TECHNICAL FIELD OF THE INVENTION

The invention relates in general to inventory management systems, and more particularly to a system and method for inventory management using mobile drive units.

BACKGROUND OF THE INVENTION

Over time, demands on modern inventory management systems have increased. Those demands include the need for more complex and diverse inventories, the need to sort and combine smaller quantities of inventory in support of order fulfillment, and more efficient use of time, space, equipment, and manpower. Accordingly, the inefficient utilization of system resources is increasingly unacceptable. Inventory management systems unable to meet these increasing demands suffer from lower system throughput, unfinished or delayed tasks, and unacceptable response times.

SUMMARY OF THE INVENTION

In accordance with the teachings of the present disclosure, disadvantages and problems associated with inventory management systems have been substantially reduced or eliminated. In particular, an inventory management system is provided that includes mobile drive units having different physical dimensions and capabilities.

In accordance with one embodiment of the present disclosure, a method for inventory management includes deploying a first mobile drive unit having first dimensions and deploying a second mobile drive unit having second dimensions, the first and second dimensions being different. The first and second mobile drive units are operable to transport inventory items to a plurality of inventory stations in the same workspace.

In accordance with another embodiment of the present disclosure, a system for inventory management includes a first mobile drive unit having first dimensions and a second mobile drive unit having second dimensions, the first and second dimensions being different. The system also includes a plurality of inventory holders. The first and second mobile drive units are each operable to transport at least one of the inventory holders in the same workspace.

Technical advantages of certain embodiments of the present invention include the ability to deploy a first mobile drive unit having first dimensions and a second mobile drive unit having second dimensions in an inventory management system. In certain embodiments, the first and second mobile drive units may operate within the same workspace at the same time. In some embodiments, the first and second mobile drive units may have overlapping or distinct workspaces. Another technical advantage may include transporting inventory holders that have different physical sizes and/or purposes. Accordingly, in some embodiments different-sized mobile drive units may each serve the same inventory station. According to the teachings of the present disclosure, the space and time required to accomplish the same task as compared to a system that does not deploy different-sized mobile drive units may be substantially reduced and/or certain operational efficiencies realized.

Other technical advantages of the present disclosure will be readily apparent to one of ordinary skill in the art from the following figures, description, and claims. Moreover, while specific advantages have been explained above, various embodiments may include some, all, or none of those advantages.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Embodiments of the present invention and its advantages are best understood by referring to FIGS. 1 through 6, wherein like numerals refer to like and corresponding parts of the various drawings.

Figure 1:
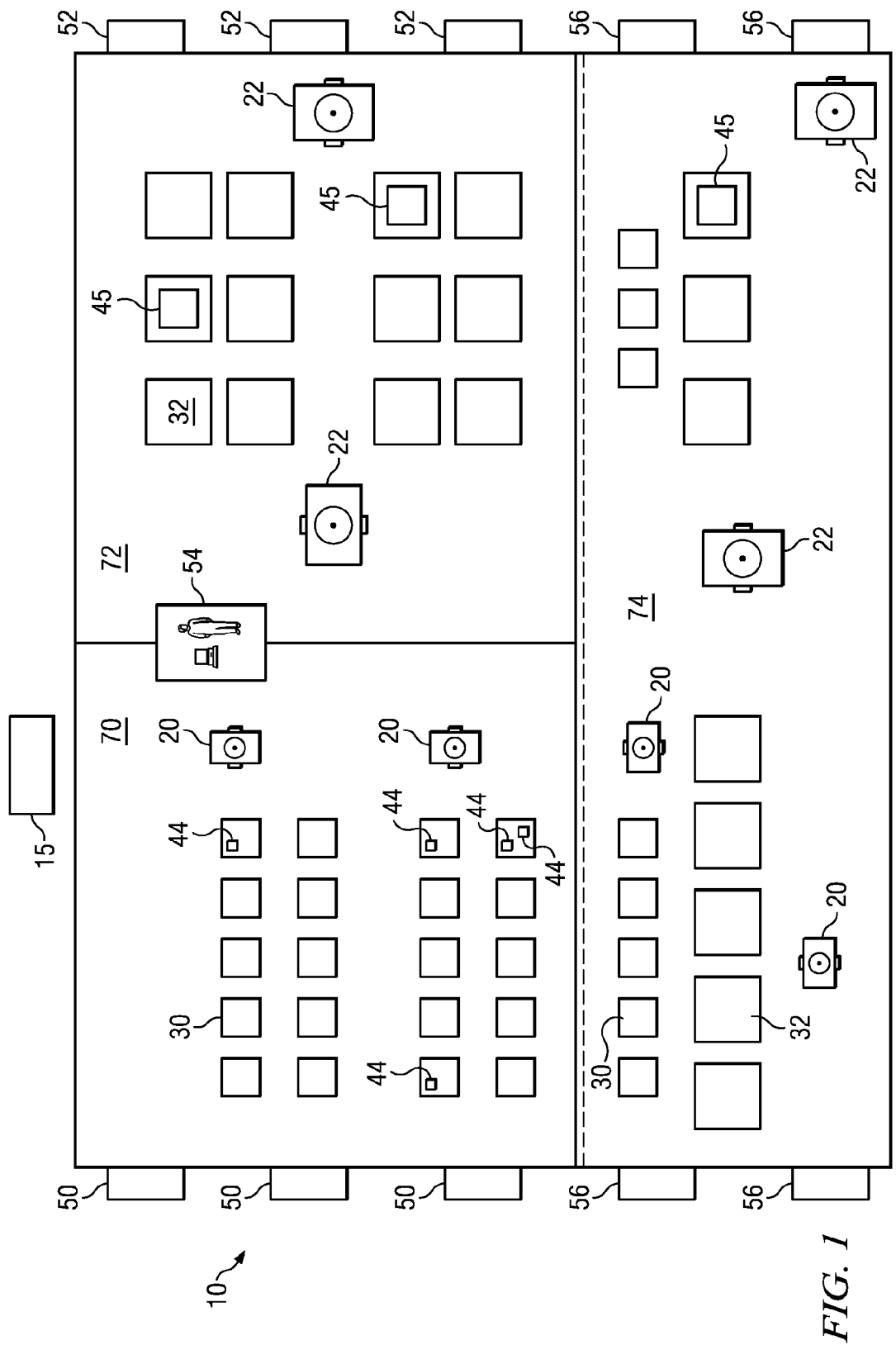
FIG. 1 is a block diagram illustrating an example embodiment of an inventory management system.

FIG. 1 is a block diagram illustrating an example embodiment of an inventory management system 10. Inventory management system 10 includes management module 15, one or more mobile drive units 20, one or more mobile drive units 22, one or more inventory holders 30, one or more inventory holders 32, and one or more inventory stations 50, 52, 54, and 56. As illustrated, mobile drive units 20 may transport inventory holders 30 within workspace 70, and mobile drive units 22 may transport inventory holders 32 within workspace 72. According to the teachings of the present disclosure, mobile drive units 20 and 22 may also operate within the same workspace 74 and may interface with the same inventory stations 54 and/or 56. Mobile drive units 20 may operate within workspaces 70 and 74, while mobile drive units 22 may operate within workspaces 72 and 74. Mobile drive units 20 may represent a type of mobile drive unit of one dimension operable to transport inventory holders 30 of certain dimensions, while mobile drive units 22 may represent a different type of mobile drive unit of a second dimension operable to transport inventory holders 32 having different dimensions than inventory holders 30. As a result, inventory management system 10 is capable of transporting inventory items between locations in workspaces 70, 72, and/or 74 to facilitate the picking, replenishment, packing, and shipping of inventory items and other inventory management tasks.

Management module 15 represents any suitable configuration of software, hardware, and controlling logic operable to facilitate and/or manage the operations of inventory management system 10. Management module 15 may include logic to schedule and execute various tasks involving the movement and processing of inventory items. Those tasks may include assigning tasks to components of inventory management system 10, such as mobile drive units 20, mobile drive units 22, and/or workers or automated equipment at inventory stations 50, 52, 54, and/or 56. In addition, management module 15 may, in some embodiments, manage and maintain components of inventory management system 10. For example, management module 15 may provision portions of workspaces 70, 72, and/or 74 for movement of mobile drive units 20 and/or 22, facilitate the deployment of mobile drive units 20 and/or 22, schedule recharging or maintenance of mobile drive units 20 and/or 22, manage storage of inventory holders 30 and/or 32, and facilitate other appropriate tasks. Management module 15 may include one or more communication interfaces to send information to and receive information from mobile drive units 20 and/or 22, such as task assignments and movement coordination. In some embodiments, management module 15 may communicate with one or more inventory stations 50, 52, 54, and/or 56. It should be noted that while management module 15 is depicted as a separate component within inventory management system 10, the functionality performed by management module 15 may be distributed over several devices. For example, the operations of management module 15 may be performed by mobile drive units 20, mobile drive units 22, and/or other appropriate components of inventory management system 10. As a result, any or all of the interactions between a particular mobile drive unit 20 and management module 15 or mobile drive unit 22 and management module 15 that are described below may, in particular embodiments, represent peer-to-peer communication between mobile drive units.

Mobile drive units 20 represent any suitable combination of devices and components operable to move inventory holders 30 in workspace 70 and/or workspace 74. Mobile drive units 20 may be designed to couple, interface, dock, or otherwise connect with inventory holders 30 in order to move inventory items stored within inventory holders 30 to any appropriate location within workspaces 70 and/or 74. For example, mobile drive units 20 may be configured to move beneath a given inventory holder 30 and lift inventory holder 30 using a docking head and/or other appropriate coupling structure. Mobile drive units 20 may include appropriate communications devices to communicate information to and from management module 15, other mobile drive units 20, mobile drive units 22, and/or inventory stations 50, 52, 54, and/or 56. In some embodiments, mobile drive units 20 may communicate with management module 15 and/or other mobile drive units using IEEE 802.11 (WiFi), IEEE 802.15 (Bluetooth), infrared data association standards, or any other appropriate wireless communication protocol. Mobile drive units 20 may include appropriate sensors to detect fixed locations or other mobile drive units 20 within workspaces 70 and/or 74 and thereby facilitate movement and/or avoid collisions. Such information may be communicated to management module 15 to assist in the function of inventory management system 10. In some embodiments, mobile drive units 20 may represent a type of mobile drive unit operable to transport pods and/or rack-shelf inventory holders 30.

Mobile drive units 22 represent any suitable combination of devices and components to function in a similar manner to mobile drive units 20, but may be of a different physical dimension suitable to move inventory holders 32 in workspace 72 and/or workspace 74, where inventory holders 32 have different dimensions than inventory holders 30. For example, mobile drive units 22 may have a different load carrying ability than mobile drive units 20. In some embodiments, the physical size of a mobile drive unit may correlate to its load carrying ability. Mobile drive units 22 may thus represent a different type of mobile drive unit than mobile drive unit 20. For example, mobile drive units 22 may represent a type of mobile drive unit operable to transport pallets and/or case-sized inventory holders 32. It should be understood, however, that while specific examples of mobile drive unit 20 and mobile drive unit 22 are discussed in the present disclosure, the teachings of the present disclosure are intended to allow many different types of mobile drive units of varying physical dimensions and varying capabilities to operate within inventory management system 10.

Inventory holders 30 store inventory items 44. In some embodiments, inventory holders 30 include multiple storage bins, each capable of holding one or more inventory items 44. Alternatively or in addition, inventory holders 30 may include a rack of shelves, each shelf capable of carrying one or more inventory items 44. Inventory holders 30 are capable of coupling with mobile drive units 20 and being carried, rolled, or otherwise moved by mobile drive units 20. Inventory holder 30 may include a plurality of faces. Each bin may be accessible through one or more faces of the inventory holder 30. For example, in some embodiments, inventory holder 30 may include four faces. In some embodiments, inventory holders 30 may represent a type of inventory holder suitable to hold orders, which may be assembled at inventory stations 50, 54, and/or 56. Mobile drive unit 20 may be operable to rotate inventory 30 at appropriate times within workspaces 70 and/or 74 to present a particular face containing the inventory items 44 needed at inventory stations 50, 54, and/or 56. Example embodiments of inventory holders 30 are illustrated in greater detail in FIGS. 2, 4B, and 5.

Inventory holders 32 store inventory items 45. In some embodiments, inventory holders 32 may represent pallets and/or case-size inventory holders. Inventory holders 32 may store bulk quantities of inventory items 45, larger inventory items 45, and/or assembled products 45. Inventory items 45 may, for example, represent bulk quantities of an inventory item 44. In some embodiments, inventory items 45 may be the same as inventory items 44. In some embodiments, all of inventory items 45 may have the same stock-keeping unit (SKU) and/or sometimes may have different SKUs. Inventory holders 32 may be suitable for transporting inventory items 45 received into inventory management system 10 from remote locations. Alternatively or in addition, inventory holders 32 may represent a type of inventory holder suitable to hold orders, which may be assembled at inventory stations 52, 54, and/or 56. For example, inventory holders 32 may transport outbound orders and/or shipments of inventory items 45. Inventory holders 32 are capable of coupling with mobile drive units 22 and being carried, rolled, or otherwise moved by mobile drive units 22. Example embodiments of inventory holders 32 are illustrated in greater detail in FIGS. 2 and 5. It should be understood, however, that while embodiments of inventory holders 30 and/or 32 are discussed in the present disclosure, the scope of the present disclosure is intended to encompass various inventory holders of any appropriate dimensions, including but not limited to inventory holders having varying heights, widths, lengths, and purposes. In addition, particular mobile drive units may be operable to transport more than one type of inventory holder, and particular inventory holders may be operable to be carried by more than one type of mobile drive unit.

Inventory stations 50, 52, 54, and/or 56 represent locations designated for the completion of particular tasks involving inventory items. Such tasks may include the removal of inventory items 44 and/or 45 from inventory holders 30 and/or 32, the introduction of inventory items 44 and/or 45 onto inventory holders 30 and/or 32, and/or the counting of inventory items 44 and/or 45 in inventory holders 30 and/or 32. In some embodiments, those tasks may include the decomposition of inventory items 45 from pallet or case-sized groups in inventory holders 32 to one or more individual inventory items 44 into inventory holders 30, and/or the composition of pallet or case-sized groups of inventory items 45 in inventory holders 32 from individual inventory items 44 in inventory holders 30. Alternatively or in addition, tasks performed at inventory stations 50, 52, 54, and/or 56 may involve processing or handling inventory items 44 and/or 45 in other suitable manners. For example, individual orders may be built and/or packed for shipment. As another example, manufactured products may be built and/or assembled from individual parts 44. In some embodiments, inventory stations 50, 52, 54, and/or 56 may simply represent physical locations where a particular task involving inventory items 44 and/or 45 can be completed within workspace 70, 72, and/or 74. In alternative embodiments, inventory stations 50, 52, 54, and/or 56 may represent both the physical location and any appropriate equipment for processing or handling inventory items 44 and/or 45, such as scanners for monitoring the flow of inventory items 44 and/or 45 in and out of inventory management system 10, and communication interfaces for communicating with management module 15. For example, inventory stations 50, 52, 54, and/or 56 may include displays for communicating tasks and other information to and from a worker or inventory manager. Inventory stations 50, 52, 54, and/or 56 may be controlled by human operators or may be fully automated. Human or automated operators in inventory stations 50, 52, 54, and/or 56 may be capable of performing certain inventory task items such as packing or counting inventory items 44 and/or 45, as part of the operation of inventory management system 10.

As depicted, inventory stations 50 may be capable of interfacing solely with mobile drive units 20 within workspace 70. Thus, inventory stations 50 may interact with inventory items 44 from mobile drive units 20. Likewise, inventory stations 52 may be capable of interfacing solely with mobile drive units 22 within workspace 72. Thus, inventory stations 52 may interact with inventory items 45 from mobile drive units 22. Inventory station 54, however, may represent a straddle transfer inventory station in which one portion of inventory station 54 interfaces with inventory holders 30 transported by mobile drive units 20 and another portion of inventory station 54 interfaces with inventory holders 32 transported by mobile drive units 22. Inventory stations 54 may thus represent locations that support tasks involving both inventory holders 30 and 32. Thus, inventory stations 54 may interact with inventory items 44 and 45 from mobile drive units 20 and 22. For example, mobile drive units 22 may transport pallet-sized and or case-sized inventory holders 32 containing bulk inventory items 45 to inventory station 54 in order to split the inventory items 45 into individual inventory items 44 and move them to inventory holders 30. Inventory stations 56 represent inventory stations in which mobile drive units 20 and 22 may interface universally within workspace 74. Thus, inventory stations 56 may interact with inventory items 44 and 45 from mobile drive units 20 and 22.

Workspace 70 represents an area associated with inventory management system 10 in which mobile drive units 20 may move and where inventory holders 30 can be stored. Likewise, workspace 72 represents an area associated with inventory management system 10 in which mobile drive units 22 may move and where inventory holders 32 can be stored. Workspace 74 represents an area associated with inventory management system 10 in which mobile drive units 20 and 22 may both move and respectively transport inventory holders 30 and 32. In some embodiments, workspace 74 may represent an area associated with inventory management system 10 in which workspaces 70 and 72 overlap. Although the illustrated figure shows an embodiment of inventory management system 10 in which the overall workspace is divided into workspaces 70, 72, and 74, particular embodiments of inventory management system 10 may include workspaces 70, 72, and 74 that have variable dimensions or an arbitrary geometry. Accordingly, workspaces 70, 72, and 74 may be arranged in accordance with any appropriate geometry suitable for the tasks associated with inventory management system 10. For example, workspaces 70, 72, and 74 may be arranged in accordance with the particular geometries of a multi-level warehouse. As another example workspaces 70, 72, and 74 may be arranged in accordance with receiving, picking, and shipping zones. Workspaces can apply to irregular settings such as airports, hospitals, and cargo ships.

As a result, while particular embodiments of inventory management system 10 are illustrated, it should be appreciated that the teachings of the present disclosure may apply to any number and types of inventory management systems. For example, inventory management system 10 may represent a mail order warehouse, wherein individual orders may be compiled at inventory stations 50, 52, 54 and/or 56 for shipment to individual customers. As another example, inventory management system 10 may represent a merchandise return facility. In such embodiments, inventory items may represent merchandise returned by customers. Such merchandise may be stored in inventory holders 30 when received at the facility from individual customers. At appropriate times, large number of units may be removed from particular inventory holders 30 and transferred at inventory station 54 and/or 56 to inventory holder 32 and packed for shipment to a warehouse or other facility. As another example, inventory management system 10 may represent an airport luggage facility. Inventory items may represent pieces of luggage stored in the luggage facility. Mobile drive units 20 may retrieve inventory holders 30 storing luggage arriving and/or departing on particular flights or luggage destined for particular types of processing such as x-ray or manual searching. As yet another example, inventory management system 10 may represent a manufacturing facility. In such embodiments, mobile drive units 20 may be capable of facilitating a manufacturing process by transporting inventory items 44 to be processed to the various inventory stations in inventory management system 10. For example, an inventory item 44 may be drilled, milled, and/or grinded at various inventory stations in inventory management system 10 in order to produce a manufactured product. Mobile drive units 22 may transport inventory holders 32 holding case-sized and/or pallet-sized groups of unfinished and/or finished goods. Although a number of example embodiments are described in the present disclosure, inventory management system 10 may, in general, represent any suitable facility or system for storing or processing inventory items and inventory items may represent objects of any type suitable for storage retrieval and/or processing in a particular production or inventory management system 10.

Figure 2:
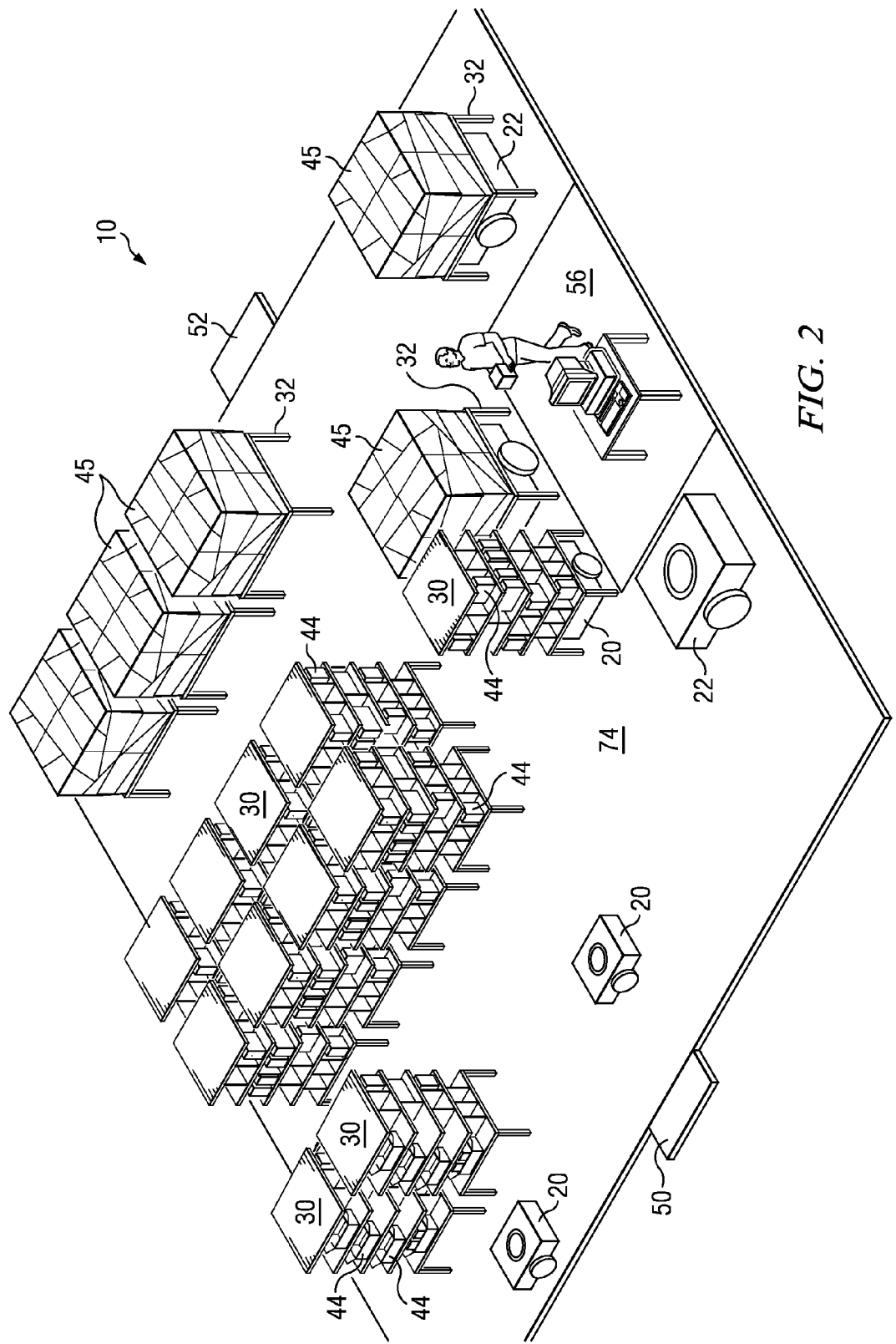
FIG. 2 is a perspective diagram illustrating an example embodiment of an inventory management system.

FIG. 2 is a perspective diagram illustrating an example embodiment of an inventory management system 10. Within inventory management system 10, mobile drive units 20 may transport inventory holders 30 and mobile drive units 22 may transport inventory holders 32 to various inventory stations 56 within the same workspace 74. Thus, each of mobile drive units 20 and mobile drive units 22 may complete various tasks assigned by management module 15 within workspace 74.

To facilitate the function of inventory management system 10, management module 15 may model and/or store a representation of workspace 74 as a two-dimensional workspace.

As illustrated, however, management module 15 models and/or stores a representation of workspace 74 as a three-dimensional workspace. In addition or in the alternative, management module 15 may model and/or store a representation of workspace 74 in other coordination spaces as appropriate. The representation of workspace 74 may include various fixed objects and/or barriers within workspace 74 as well as the physical boundaries of workspace 74. In addition, management module 15 may store the locations and corresponding representations of mobile drive units 20, mobile drive units 22, inventory holders 30, and/or inventory holders 32 in two dimensions and/or three dimensions. Management module 15 may coordinate and/or assign tasks to the various components of inventory management system 10. After assigning a task to a given mobile drive unit 20 and/or 22, management module 15 may plan paths for mobile drive units 20 and/or 22.

Management module 15 may enforce a reservation policy based on various appropriate factors within workspace 74. For example, the reservation policy may be based on the location of a fixed object and/or the location of inventory holders 30 and/or 32. As another example, the reservation policy may be based on a predetermined number of maximum drives for a given region of workspace 74, a predetermined maximum weight limit for the region, and/or other characteristics of mobile drive units 20 and/or 22. In some embodiments, the reservation policy may be based on characteristics of inventory items 44 and/or 45, which may constrain certain inventory items 44 and/or 45 and/or types of inventory items 44 and/or 45 to certain regions of workspace 74. For example, high value inventory and/or hazardous materials may be constrained to certain regions of workspace 74. In addition or in the alternative, reservation policies may govern dynamic characteristics of movement of mobile drive units 20 and/or 22 within a region of workspace 74. For example, a reservation policy may be based on maximum speed limits, maximum acceleration/deceleration rates, and/or other dynamic characteristics of the movement. Reservation policies may also govern valid stopping locations within workspace 74 and/or may enforce minimum distances between mobile drive units 20 and/or 22. Management module 15 may determine whether particular reservation requests received from mobile drive units 20 and/or 22 may be granted based on the reservation policy and/or the locations and states of other mobile drive units 20 and/or 22. In some embodiments, management module 15 may additionally or alternatively determine whether to apply restrictions to a granted reservation based on the reservation policy. Management module 15 may determine whether reservation requests received from mobile drive units 20 and/or mobile drive units 22 may be granted. More detailed techniques for implementing path planning and reservation policies will be discussed below with respect to FIG. 5.

In an example embodiment of operation, mobile drive unit 20 is a type of mobile drive unit operable to transport relatively smaller inventory holders 30, while mobile drive unit 22 is a type of mobile drive unit operable to transport relatively larger pallet or case-sized inventory holders 32. Mobile drive units 20 and mobile drive units 22 are deployed within inventory management system 10. Management module 15 may then facilitate the administration and management of the various components of inventory management system 10.

Management module 15 may determine various tasks to complete orders. Management module 15 may, for example, determine that an order including various inventory items 44 and/or 45 is to be assembled at inventory stations 56. Management module 15 determines the location of the inventory items 44 and/or 45 within the various inventory holders 30 and/or 32 and assigns an appropriate number of mobile drive units 20 and/or 22 to retrieve those inventory holders. Management module 15 communicates tasks to mobile drive units 20 and/or 22 to retrieve those inventory holders 30 and/or 32 and transport them to inventory stations 56. After receiving an appropriate task assignment from management module 15, each of the mobile drive units 20 and/or 22 may move to its assigned inventory holder 30 and/or 32, dock with inventory holder 30 and/or 32, and transport inventory holder 30 and/or 32 to inventory stations 56. Once the inventory holders 30 and/or 32 are at the appropriate inventory station, a user may retrieve the appropriate inventory items 44 and/or 45 to complete the order. Once the order is complete, mobile drive units 20 and/or 22 may be assigned tasks to transport the inventory holders 30 and/or 32 to appropriate destinations within inventory management system 10, such as other inventory stations 56 and/or storage locations. Once those tasks are complete, mobile drive units 20 and/or 22 may indicate to management module 15 that they are available for additional task assignments.

Management module 15 may receive status information from various components of inventory system 10 and may respond appropriately. For instance, management module 15 may receive information indicating when each of the tasks described above are completed. Management module 15 may assign additional tasks accordingly. As another example, management module 15 may receive information indicating that inventory items 45 have been received into inventory management system 10 from inventory stations 52. In response, management module 15 may transmit tasks to mobile drive units 22 to transport those inventory items 45 in inventory holders 32 to appropriate destinations within workspace 72 and/or 74. For instance, management module 15 may assign a task to a given mobile drive unit 22 to move an inventory holder 32 to a storage location in workspace 72 and/or 74 for storage. As another example, management module 15 may assign a task for a given mobile drive unit 22 to transport an inventory holder 32 to inventory station 56 so that inventory items 44 may be disassembled and stored in inventory holders 30. Accordingly, management module 15 may assign tasks to mobile drive units 20 to transport inventory holders 30 having available storage space to inventory station 56. A user may then disassemble inventory items 45 into individual inventory items 44 and store those inventory items 44 into inventory holders 30. While the above operation is explained by way of example, it should be understood that any number and type of tasks may be completed at inventory stations 56 involving inventory holders 30 and/or 32 and mobile drive units 20 and/or 22. For example, inventory items 44 from inventory holders 30 may be used to build pallet or case-sized inventory holders 32 of inventory items 45.

Management module 15 may also assign inventory tasks based on the capabilities of inventory stations 50, 52, 54, and 56 and/or inventory restrictions associated with those inventory stations. For example, management module 15 may store and/or determine the ability for inventory items to be transported to given inventory stations 50, 52, 54, and/or 56. Based on the inventory items 44 and/or 45 accessible to a given inventory station 50, 52, 54, and/or 56, management module 15 may assign tasks to that inventory station 50, 52, 54, and/or 56 associated with those inventory items 44 and/or 45. Management module 15 may also assign certain inventory tasks to inventory stations 50, 52, 54, and/or 56 based on the capabilities of those inventory stations 50, 52, 54, and/or 56 to perform certain tasks. For example, certain inventory stations 52, 54, and/or 56 may be capable of processing pallets 32. When processing a given order, management module 15 may determine that an inventory item 45 appropriate for the order is in pallet 32. Based on that determination, management module 15 may assign that order to an inventory station 52, 54, and/or 56 capable of processing pallets 32. When processing the order, management module 15 may also determine, for example, that an inventory item 44 appropriate for the order is in a given inventory holder 30. Management module 15 may then assign the order to an inventory station 54 and/or 56 capable of processing inventory items 44 and pallets 32. Management module 15 may additionally or alternatively assign orders to inventory stations 50, 52, 54, and/or 56 based on the locality of inventory holders 30 and/or 32 appropriate for those orders within inventory management system 10.

Figure 3:
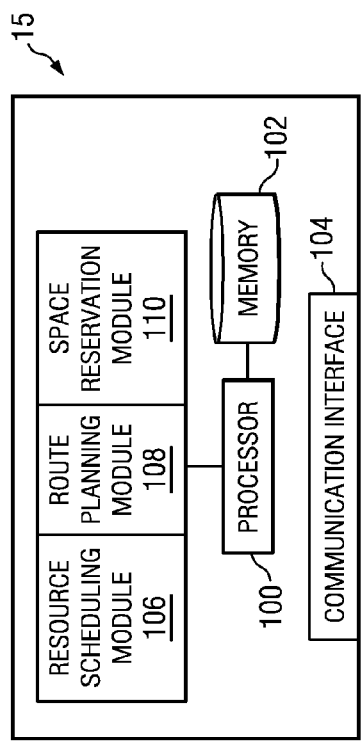
FIG. 3 is a block diagram illustrating an example embodiment of a management module according to an example embodiment of an inventory management system.

FIG. 3 is a block diagram illustrating an example embodiment of management module 15 according to an example embodiment of an inventory management system 10. As illustrated, management module 15 includes processor 100, memory 102, communication interface 104, resource scheduling module 106, route planning module 108, and space reservation module 110.

Processor 100 represents any suitable collection of hardware, software, and/or controlling logic operable to control the operation and administration of elements within management module 15. For example, processor 100 may operate to process information and/or commands received from communication interface 104, memory 102, resource scheduling module 106, route planning module 108, and/or space reservation module 110. Processor 100 may be a microcontroller, processor, programmable logic device, application-specific integrated circuit, field programmable gate array, digital signal processor, and/or any other suitable specific or general purpose processors. In some embodiments, processor 100 may represent multiple parallel and/or multi-core processors.

Memory 102 represents any one or a combination of volatile or non-volatile, local or remote devices suitable for storing information. For example, memory 102 may include random access memory, read-only memory, magnetic storage devices, optical storage devices, hard disks, flash memory, or other suitable information storage device or combination thereof. Accordingly, memory 102 stores either permanently or temporarily files and other information such as resource module 106, route planning module 108, space reservation module 110, and/or any other appropriate code or instructions operable to facilitate the operation of management module 15. In some embodiments, memory 102 may store, either temporarily or permanently, serial input/output received from communication interface 104.

Communication interface 104 represents any suitable collection of hardware, software, and/or controlling logic capable of communicating information to and receiving information from various elements within inventory management system 10, such as mobile drive units 20, mobile drive units 22 and/or inventory stations 50, 52, 54, and/or 56. Communication interface 104 may represent a network interface card, Ethernet card, port application-specific integrated circuit, wireless communication module, or other appropriate interface operable to communicate with elements of inventory management system 10. For example, management module 15 may communicate with inventory stations 50, 52, 54, 56, mobile drive units 20, and/or mobile drive units 22 using IEEE 802.11 (WiFi), IEEE 802.15 (Bluetooth), infrared data association standards, or any other appropriate wireless communication protocol.

In general, resource scheduling module 106, route planning module 108, and space reservation module 110 represent any appropriate combination of hardware, software, controlling logic, algorithms, or heuristics, operable to provide the functionality described in the present disclosure. Example functionality of each module is described in more detail below. It should be understood, however, that while described as separate modules, the functionality provided by each of resource scheduling module 106, route planning module 108, and space reservation module 110 may be provided by one module or many modules and/or may be distributed among various components of inventory management system 10.

Resource scheduling module 106 processes received inventory requests and generates one or more assigned inventory tasks to be completed by the various components of inventory management system 10. Resource scheduling module 106 may also select one or more appropriate components for completing the assigned tasks and, using communication interface 104, may communicate the assigned tasks to the relevant components. Resource scheduling module 106 may utilize the current assignment state of various components within inventory management system 10 to facilitate the assignment of tasks. Additionally, resource scheduling module 106 may be responsible for generating assigned miscellaneous tasks associated with various management operations such as assigning tasks to mobile drive units 20 and mobile drive units 22. For example, resource scheduling module 106 may request mobile drive units 20 and/or 22 to recharge batteries or have batteries replaced, instruct inactive mobile drive units 20 and/or 22 to park in an appropriate location, and/or direct mobile drive units 20 and/or 22 to appropriate locations for repair and/or scheduled maintenance. In some embodiments, resource scheduling module 106 may assign tasks to various inventory stations 50 to indicate orders for packing, inventory items for unpacking, and/or other appropriate tasks along with appropriate information necessary to complete such tasks. For example, resource scheduling module 106 may communicate one or more tasks to be completed by workers located at inventory stations 50. Additionally or alternatively, resource scheduling module 106 may receive status updates from the various components of inventory management system 10. Accordingly, resource scheduling module 106 may update its internal resource schedule appropriately.

Route planning module 108 receives route requests from mobile drive units 20 and/or 22. Route requests may identify one or more destinations associated with the tasks assigned by resource scheduling module 106. Route requests may also identify the location of the mobile drive unit 20 and/or 22 making the request. In response to receiving a route request, route planning module 108 determines a path from the location of the requesting mobile drive unit 20 and/or 22 to one or more destinations identified in the route request. Route planning module 108 may implement any appropriate algorithms utilizing any appropriate parameters, factors and/or considerations to determine an appropriate path within workspace 74. For example, route planning module 108 may utilize a three-dimensional representation of workspace 74 to determine the locations of fixed objects and/or other components of inventory management system 10. Route planning module 108 may then plan a route appropriately based on the locations of those objects and/or components. After determining an appropriate path, route planning module 108 may utilize communication interface 104 to transmit a route response identifying the path to the requesting mobile drive unit 20 and/or 22. In some embodiments, route planning module 108 may determine multiple paths for each mobile drive unit 20 and/or 22.

Space reservation module 110 receives reservation requests from mobile drive units 20 and/or 22 that are attempting to move along paths determined by route planning module 108. Each path may be divided into a series of segments. Each reservation request may attempt to reserve one or more segments along the determined path. For each segment of the determined path, a requesting mobile drive unit 20 and/or 22 attempts to reserve the amount of space required to move along that segment. In some embodiments, the amount of space requested corresponds to the two-dimensional footprint of the requesting mobile drive unit 20 and/or 22, along with the footprint of any associated load that the mobile drive unit 20 and/or 22 may be carrying, such as inventory holder 30 and/or 32. In other embodiments, the amount of space requested corresponds to the amount of three-dimensional volume required to move along that segment. In particular, a requesting mobile drive unit 20 and/or 22 may attempt to reserve one or more sets of workspace volumes associated with the physical dimensions of mobile drive unit 20 and/or 22, along with any load the mobile drive unit 20 and/or 22 may be carrying. Likewise, for each segment of the determined path, a requesting mobile drive unit 22 attempts to reserve one or more sets of workspace volumes associated with the physical dimensions of mobile drive unit 22. Space reservation module 110 may determine a number of workspace volumes required for a given mobile drive unit based on a segment volume associated with that mobile drive unit. These techniques are explained in more detail below with respect to FIGS. 4A, 4B, and 5.

Space reservation module 110 determines whether the requesting mobile drive unit 20 and/or 22 is allowed to use the requested space based on various factors. For example, space reservation module 110 may determine whether the requested set of three-dimensional workspace volumes intersects with any other workspace volumes reserved by another component of inventory management system 10, such as a fixed object or another mobile drive unit 20 and/or 22. Thus, space reservation module 110 may ensure that no physical interferences take place within workspace 74. Space reservation module 110 may then determine whether the requested space conflicts with a reservation policy. In some instances, a reservation policy may be overridden based on the nature of the reservation policy. After determining whether the reservation request may be granted, space reservation module 110 transmits, using communication interface 104, a reservation response granting or denying the reservation request to the requesting mobile drive unit 20 and/or 22.

Figure 4B:
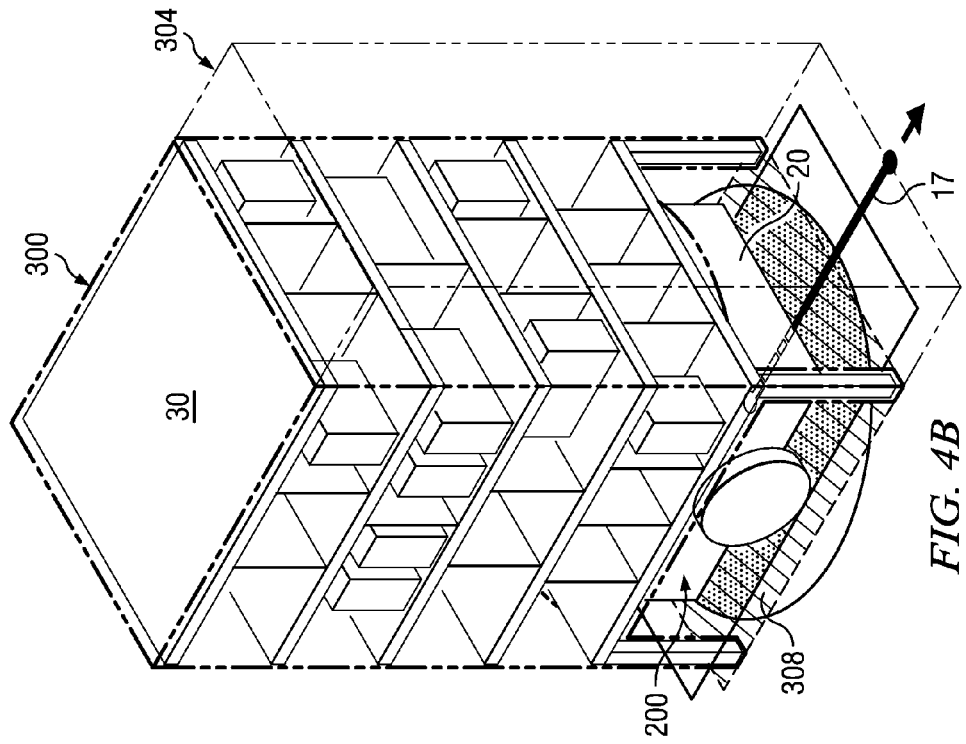
FIGS. 4A and 4B are perspective diagrams illustrating techniques for defining three-dimensional segment volumes with respect to an example mobile drive unit and inventory holder in an example embodiment of an inventory management system.
Figure 4A:
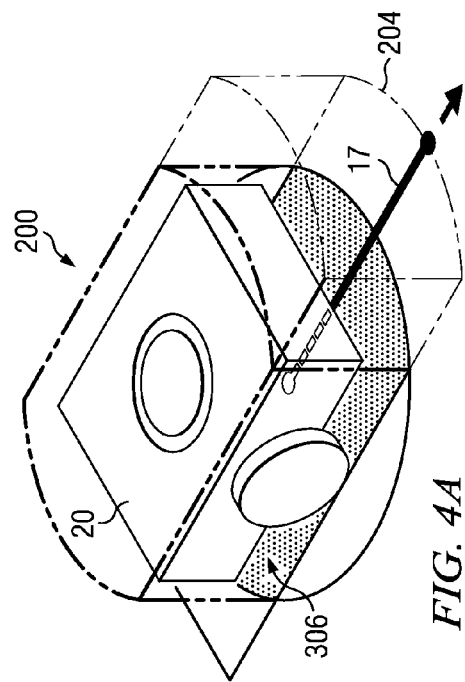

FIGS. 4A and 4B are perspective diagrams illustrating techniques for defining three-dimensional segment volumes with respect to an example mobile drive unit 20 and inventory holder 30 in an example embodiment of an inventory management system 10. In certain embodiments, mobile drive units 20 and/or 22 and inventory holders 30 and/or 32 may be modeled by the use of three-dimensional shapes, or volume segments, to facilitate movement within workspace 74. Accordingly, each mobile drive unit 20 and mobile drive unit 22 are resolved into a volume segment that represents the space required by the respective mobile drive unit to move within workspace 74. The volume segment for each mobile drive unit may be used by management module 15 to determine which workspace volumes within workspace 74 are requested by each reservation request.

As illustrated in FIG. 4A, the three-dimensional volume segment 200 for mobile drive unit 20 is represented by the intersection between a rectangular cube and a cylindrical shape. Volume segment 200 may represent the amount of space required by the mobile drive unit 20 to move within a given space in workspace 74. In some embodiments, volume segment 200 may be projected along the length of a given segment 17 to form volume segment 204. Thus, when mobile drive unit 20 transmits a reservation request for segment 17, the set of workspace volumes requested may correspond to volume segment 204. Additionally or alternatively, volume segment 200 may be modified to represent the volume required by mobile drive unit 20 to rotate within a given space. It should be noted that the illustrated volume segment is provided as an example corresponding to a particular embodiment of mobile drive unit 20, and a similar technique may be employed to define volume segments for any number and type of mobile drive units, including mobile drive units 22.

As illustrated in FIG. 4B, an example inventory holder 30 is represented as a volume segment 300 including a rectangular cube for the main body of inventory holder 30 and four rectangular cubes representing the legs of inventory holder 30. As illustrated, a volume segment 200 representing mobile drive unit 20 may be modified to include volume segment 300 when mobile drive unit 20 docks with inventory holder 30. In some embodiments, volume segment 200 and volume segment 300 may be projected along the length of a given segment 17 to form volume segment 304. Thus, when mobile drive unit 20 transmits a reservation request for segment 17, the set of workspace volumes requested may correspond to volume segment 304. A similar technique may be employed with respect to mobile drive units 22 and inventory holders 32.

Accordingly, mobile drive units 20, mobile drive units 22, inventory holders 30, inventory holders 32, and various fixed objects within workspace 74 may be modeled as three-dimensional volumes. Based on these volumes, a reservation policy may be applied to facilitate planning paths for mobile drive unit 20 and mobile drive unit 22 throughout workspace 74. More details on such techniques will be illustrated with respect to FIG. 5 below.

It should be noted, however, that similar modeling techniques may be employed to represent mobile drive units 20, 22, and any associated loads in two-dimensional space. For example, in FIG. 4A, footprint 306 may represent mobile drive unit 20 in two-dimensional space, while in FIG. 4B, footprint 308 may represent mobile drive unit 20 and inventory holder 30 in two-dimensional space. Techniques for coordinating the movement of mobile drive units 20 and 22 in workspace 74 using two-dimensional representations are also explained below.

Figure 5:
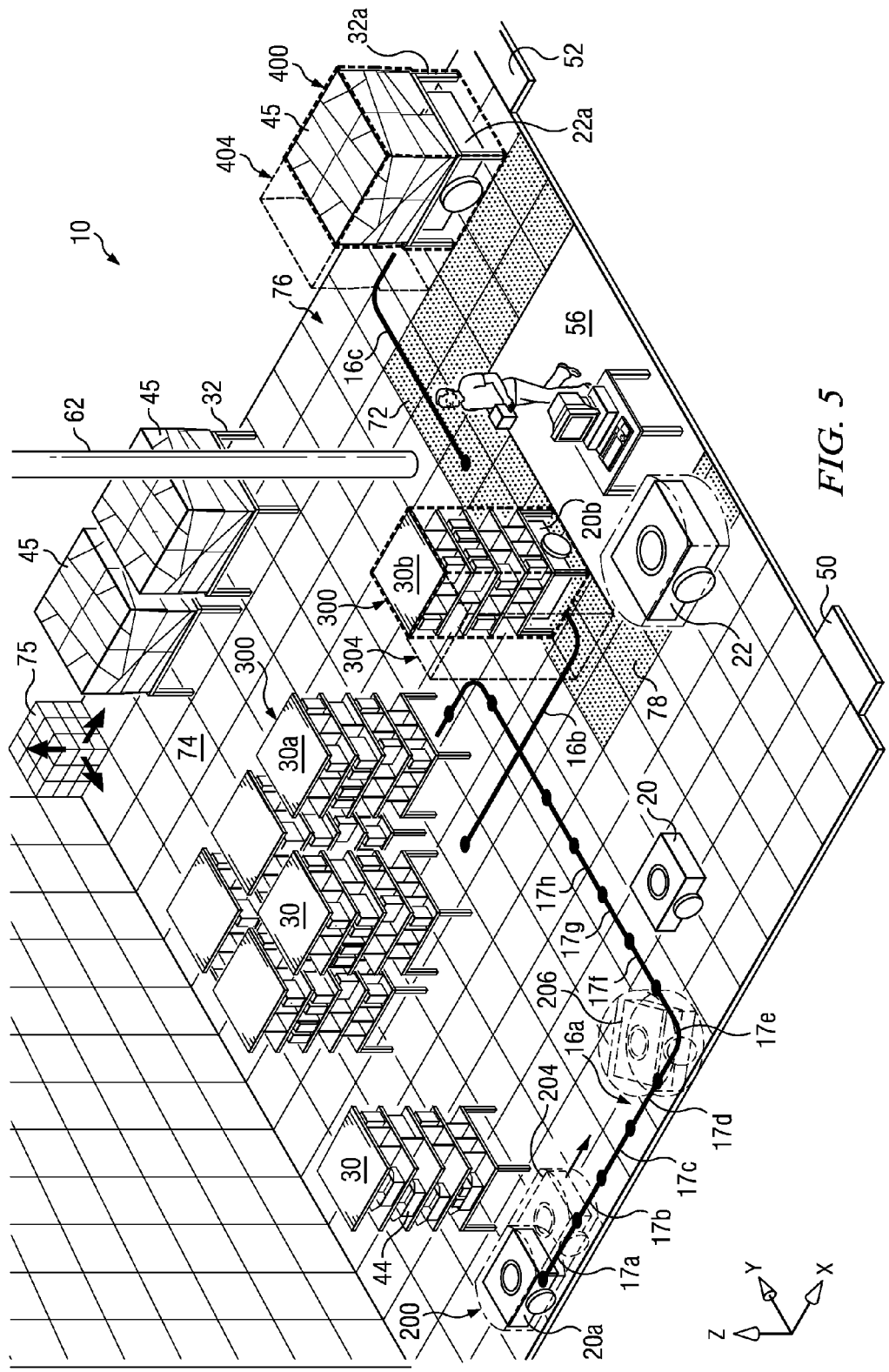
FIG. 5 is a perspective diagram illustrating techniques for path planning and volume reservation according to an example embodiment of an inventory management system.

FIG. 5 is a perspective diagram illustrating techniques for path planning and space reservation according to an example embodiment of inventory management system 10. In the illustrated examples, mobile drive units 20 and/or 22 receive various tasks from resource scheduling module 106 of management module 15. Based on the respective assigned tasks, mobile drive units 20 and/or 22 may request, from route planning module 108 of management module 15, a path to a destination associated with their respective assigned tasks. For example, as illustrated, mobile drive unit 20a may receive a task to retrieve inventory holder 30a from a storage location associated with inventory holder 30a in workspace 74. Mobile drive unit 20a may then request a path to the storage location. Likewise, mobile drive unit 20b may receive a task to transport an inventory holder 30b from inventory station 56 to a destination within workspace 74 for storage and may then request a path to the storage location. Meanwhile, mobile drive unit 22a may receive a task to transport a pallet inventory holder 32a from inventory station 52 to inventory station 56 and may then request a path to inventory station 56.

In the illustrated embodiment, workspace 74 may be associated with a grid of three-dimensional workspace volumes 75. Workspace volumes 75 within the three-dimensional space may be indexed according to a global coordinate system having x, y, and z coordinates. In some embodiments, workspace 74 may additionally or alternatively be associated with a two-dimensional floor layout and/or map of workspace 74. In some embodiments, workspace 74 may be represented in two-dimensional space by a grid of workspace cells 76. In other embodiments, however, workspace 74 may be represented in two-dimensions without the use of workspace cells 74. For example, workspace 74 may be represented by two-dimensional footprints and/or projections of the various objects within inventory management system 10. Thus, a given location in workspace 74 may be identified by a set of workspace volumes 75, one or more workspace cells 76, and/or by the location of its two-dimensional footprint. It should be understood, however, that while certain embodiments of inventory management system 10 may include only workspace volumes 75, only workspace cells 76, or only the two-dimensional footprints of physical and/or virtual objects, other embodiments may include any combination of workspace volumes 75, workspace cells 76, and/or two-dimensional footprints.

Workspace volumes 75 and/or workspace cells 76 describing workspace 74 may be described in any appropriate increments. For example, in some embodiments, workspace volumes 75 may be described in millimeter increments. Workspace cells 76, in some embodiments, may be described as larger increments than workspace volumes 75. For example, workspace cells 76 may be described in increments of fifty or more centimeters and/or as appropriate based on the physical dimensions of mobile drive units 20, mobile drive units 22, inventory holders 30, and/or inventory holders 32. In some embodiments, workspace 74 may be associated with two sets of workspace cells 76, with one set described in increments corresponding to mobile drive units 20 and a second set described in increments corresponding to mobile drive units 22. Mobile drive units 20 and/or 22 may be configured to move within workspace 74 by navigating from the center of one workspace cell to the center of another workspace cell. Additionally or in the alternative, workspace 74 may be defined as a set of nodes, which may indicate valid stopping points, turning points, junctions, and/or intersections. Nodes may be indicated with the use of fixed object markers, or fiducials. When a node is detected, mobile drive units 20 and/or 22 may determine that a given destination associated with that node has been reached. Nodes may be connected by edges. In such embodiments, route planning module 108 may plan paths from node to node, evaluating space needed to pass from one node to the next to determine viability. It should be noted, however, that while a node may indicate a valid stopping point, that does not mean a mobile drive unit 20 and/or 22 is required to always stop and/or turn at that node. Likewise, mobile drive units 20 and/or 22 may stop and/or turn at other locations within workspace 74 besides at nodes.

Based on one or more characteristics of a given space within workspace 74, an appropriate component of management module 15 may assign and/or determine a state of that space. For example, management module 15 may assign a state to a given workspace volume 75, workspace cells 76, and/or two-dimensional footprints of objects within inventory management system 10. Example states may include occupied, reserved, and/or empty. In some embodiments, the state of a given workspace volume 75, workspace cell 76, and/or footprint may include identifying information associated with the component occupying that workspace volume 75, workspace cell 76, and/or footprint. For example, management module 15 may determine that an inventory holder 30 and/or 32 is being stored within one or more workspace cells 75 and/or workspace volumes 76, and the state is represented as occupied and/or reserved. Alternatively or in addition, management module 15 may determine that a given footprint is a two-dimensional projection of an inventory holder 30 and/or 32 onto the representation of workspace 74. In some embodiments, inventory management system 10 may individually identify particular components such as mobile drive units or inventory holders. Accordingly, a given object within workspace 74 may be represented in three dimensions by assigning a state associated with that object to a set of workspace volumes 75 associated with the total volume of that object. Management module 15 may store the state of each of the sets of workspace cells 76, workspace volumes 75, and/or footprints in memory 102 in order to facilitate the assignment of tasks and/or movements of mobile drive units 20 and/or 22.

Management module 15 may associate a reservation status with various spaces within inventory management system 10. For example, management module 15 may associate a reservation status with workspace volumes 75, workspace cells 76, and/or footprints of objects within inventory management system 10. Reservations may have types according to a reservation policy. Reservation policies may govern whether reservation requests may be granted. Reservation policies may be based on various path planning and/or path reservation constraints. In embodiments where workspace 74 is modeled in three dimensions, for example, reservation policies may determine whether a path may be planned through a given set of volumes and/or whether a given set of volumes along that path may be reserved. Path planning constraints may include geographic limitations of workspace 74 such as fixed objects, walls, and other physical and/or virtual barriers. In some embodiments path planning constraints may include idle mobile drive units and/or stored inventory holders. Path reservation constraints may include inventory holder locations, the locations of other moving mobile drive units, and maximum drives allowed in a given region. Volumes representing any number of fixed objects 62 and/or other physical components of workspace 74 may hold a reservation on a given set of workspace volumes 75. In some embodiments, a reservation may be held by a virtual object and/or barrier such as a doorway or other logical barrier. Similar techniques may be used for two-dimensional representations of workspace 74.

A reservation may be permanent, temporary, or conditional. Accordingly, a fixed object 62 may have a permanent reservation policy applied to it and thus ensure that route planning module 108 cannot plan a path for mobile drive units 20 and/or 22 through an area of workspace 74 containing a fixed object 62. In some embodiments, idle mobile drive units and/or stored inventory holders may have a permanent or temporary reservation policy applied to them. Mobile drive units 20, mobile drive units 22, inventory holders 30, and/or inventory holders 32, however, may have temporary reservation policies applied to them. Some portions of workspace 74, such as workspace region 78 surrounding inventory station 56, may have a conditional reservation policy applied to it. Accordingly, in some embodiments, management module 15 may conditionally grant reservations in workspace region 78 only to mobile drive units having certain characteristics. Additionally or alternatively, management module 15 may limit the number and/or types of mobile drive units allowed within workspace region 78. For example, management module 15 may set a maximum number of allowed mobile drive units within workspace region 78 and/or may only allow mobile drive units 20 at certain times and mobile drive units 22 at other times within workspace region 78. In some embodiments, workspace region 78 may allow both mobile drive units 20 and mobile drive units 22 at the same time. Additionally or alternatively, workspace region 78 may allow mobile drive unit reservations based on the owner or administrator of the mobile drive unit. Thus, a set of reservation policies may be associated with workspace 74 to facilitate the reservation of workspace volumes 75 within inventory management system 10. In embodiments where workspace 74 is represented in two dimensional space, reservation policies describing height restrictions may be applied to given locations within workspace 74. Thus, in such embodiments, while a reservation request may not determine that the requested space intersects with a reserved volume, a reservation policy may restrict the movement of mobile drive units 20 and/or 22 that may be too tall to traverse through a given area.

Upon receiving a path request from mobile drive units 20 and/or 22, route planning module 108 of management module 15 may determine a path to the destination based on the current location of the respective mobile drive unit and/or other appropriate characteristics of workspace 74. For example, route planning module 108 may determine a node-to-node path from the current location of the mobile drive unit 20 and/or 22 to its chosen destination. In some embodiments, route planning module 108 may determine an appropriate path based on the current state of each of the workspace cells 76, workspace volumes 75, or footprint of objects within workspace 74. For example, route planning module 108 may plan the path based on the reservation status of workspace volumes 75. In some embodiments, route planning module 108 may determine the path based on the state of workspace volumes 75, workspace cells 76, and/or footprints corresponding to the type of mobile drive unit requesting the path.

Route planning module 108 may plan the path based on existing volumetric reservation data. In some embodiments, route planning module 108 may plan the path based on one or more reservation policies associated with one or more workspace volumes 75 in workspace 74. In some embodiments, those reservation policies are based on path planning constraints. For example, route planning module 108 may plan to avoid any permanent volume reservations held by fixed objects 62 such as poles, stairways, overhead obstacles, walls or other fixed barriers. In some embodiments, route planning module 108 may also plan to avoid idle mobile drive units and/or stored inventory holders. Temporary and/or conditional reservations may be released and/or satisfied before a given component attempts to reserve that space. Route planning module 108 may accordingly include temporary and/or conditional reservations in the planned paths. For example, a set of workspace volumes 75 temporarily reserved by a mobile drive unit 20a may be included in a planned path for mobile drive unit 20b.

As discussed above, route planning module 108 may take into account the physical volume of a given mobile drive unit when planning paths. In some embodiments, route planning module 108 may determine that the volume segment representing the physical volume of mobile drive unit 20 and/or 22 will intersect a reserved space within workspace 74. Alternatively or in addition, a reservation policy may govern any height restrictions associated with a given area of workspace 74. Thus, based on volume intersections and/or height restriction policies, route planning module 108 may plan paths for mobile drive units 20 that would not be possible or acceptable if taken by mobile drive units 22. For example, route planning module 108 may plan a path for mobile drive unit 20 to pass below an overhead obstacle that would be impossible by mobile drive unit 22 due to mobile drive unit 22's greater height. Likewise, route planning module 108 may determine not to plan the same path beneath the overhead obstacle if mobile drive unit 20 is transporting inventory holder 30.

Route planning module 108 may then communicate information identifying the path to the requesting mobile drive units 20 and/or 22. For example, as illustrated, route planning module 108 transmits path 16a to mobile drive unit 20a, path 16b to mobile drive unit 20b, and path 16c to mobile drive unit 22a. A given path may be divided into one or more segments 17, which may specify intermediate points along that path. In some embodiments, a segment may correspond to the length from the center of one workspace cell to the center of another workspace cell. Additionally or alternatively, route planning module 108 may determine multiple alternative paths to a given destination. Route planning module 108 may communicate information to mobile drive units 20 and/or 22 identifying alternative paths and/or may prioritize paths based on various appropriate cost factors such as time, length, and/or efficiency.

Once route planning module 108 has transmitted paths 16, the information is received by each respective mobile drive unit 20 and/or 22. Once a mobile drive unit 20 and/or 22 receives path 16, the respective mobile drive unit then attempts to reserve segment 17, which may comprise one or more workspace volumes 75 associated with the dimensions of mobile drive unit 20 and/or 22, as discussed above with respect to FIGS. 4A and 4B. Alternatively, segment 17 may represent a two-dimensional footprint associated with the dimensions of mobile drive unit 20 and/or 22. In other embodiments, segment 17 may represent one or more workspace cells 76. In some embodiments, mobile drive units 20 and/or 22 may transmit information including a reservation request to space reservation module 110 of management module 15. For example, volume segment 200 may represent mobile drive unit 20a. Mobile drive unit 20a may request to reserve segment 17a of path 16a, where segment 17a comprises volume segment 204, where volume segment 204 is a projection of volume 200 along path 16a. As another example, volume segment 300 may represent mobile drive unit 20b and its associated load, which is inventory holder 30b in the illustrated example. Mobile drive unit 20b may request a segment of path 16b comprising volume segment 304, where volume segment 304 is a projection of volume 300 along path 16b. As another example, volume segment 400 may represent mobile drive unit 22a and its associated load, which is inventory holder 32a and inventory item 45 in the illustrated example. Mobile drive unit 22a may request a segment of path 16c comprising volume segment 404, where volume segment 404 is a projection of volume 400 along path 16c.

Once space reservation module 110 receives a reservation request for a segment 17 of path 16, space reservation module 110 determines whether to grant the space representing the requested segment. For example, the requested space may be a set of one or more workspace volumes 75 representing the requested volume segment 17. In some embodiments, space reservation module 110 determines whether the requested segment 17 intersects with space that has been temporarily and/or conditionally reserved by a component of inventory management system 10. For example, an inventory holder 30 may hold a temporary reservation on a set of workspace volumes 75 corresponding to volume 300. In some embodiments, a smaller portion of the requested set of workspace volumes 75 may be granted. Additionally or alternatively, portions of the originally requested set of workspace volumes 75 may be granted as their reservation status changes from reserved by a different object to unreserved. For example, two mobile drive units 20 and/or 22 may request segments 17 along the same region of workspace 74, such as an aisle between rows of inventory holders 30 and/or 32. The leading mobile drive unit 20 or 22 may be given some or all of the workspace volumes 75 that it requests. As that mobile drive unit 20 or 22 progresses along segments 17, the mobile drive unit 20 or 22 behind it may be given new portions of the originally requested segment 17 as those portions become available due to the evacuation of the leading mobile drive unit 20 or 22. Accordingly, one mobile drive unit 20 or 22 may follow another mobile drive unit 20 or 22 when they are moving in the same direction.

Space reservation module 110 determines whether to grant the requested segment based on determining whether the requested segment intersects with temporarily reserved space, such as space reserved by one or more workspace volumes 75, workspace cells 76, and/or footprints of objects in inventory management system 10. Space reservation module 110 may also determine whether the requested segment conflicts with a conditional reservation policy. For example, a requested volume segment may conflict with a conditional reservation policy associated with the requested workspace volumes 75. If the space reservation module 110 determines that the request can be granted, a reservation response will be transmitted to the requesting mobile drive unit 20 and/or 22 and the mobile drive unit 20 and/or 22 will then traverse the requested segment. If the request is not granted, the requesting mobile drive unit may then request the segment again, may request a new path, and/or may request a segment from an alternate path according to a priority set by route planning module 108. Once mobile drive unit 20 has successfully reserved segment 17, mobile drive unit 20 moves along segment 17. In some embodiments, if a given mobile drive unit, such as first mobile drive unit 20 fails, then a space, such as a set of workspace volumes 75, may be reserved large enough to account for any positional uncertainty of the mobile drive unit. At some point, after beginning movement, mobile drive unit 20 may request the next segment. For example, it may request a segment, before, during or after the traversal along segment 17a has been requested. The process of requesting volume segments 204 is repeated along path 16a until the desired destination is reached. For example, as illustrated, mobile drive unit 20a requests segment 17a to segment 17h corresponding to path 16a, each segment 17 comprising volume segments 204. It should be noted that as illustrated, path 16a includes one or more turns and/or curves. At such turns, mobile drive unit 20a may request a rotation reservation, in which mobile drive unit 20a requests workspace volumes 75 corresponding to the amount of space 206 required to execute a rotation maneuver. Mobile drive unit 20a may continue reserving segments 17 of path 16a until reaching the destination. Thus, mobile drive unit 20a may move to inventory holder 30a in workspace 74. Mobile drive units 20b and 22a may traverse their respective paths 16b and 16c in like manner by requesting to reserve volume segments associated with their respective dimensions.

Space reservation module 110 may determine that the requested segment is physically occupied by an object such as inventory holder 30 and/or inventory holder 32, or other mobile drive units 20 and/or 22. Space reservation module 110 may then determine that the requested portion of the requested segment is not reserved by the three-dimensional volume representing the physical object. For example, there may be a space beneath inventory holder 30 or 32 under which mobile drive unit 20 and/or 22 may pass. Thus, by reserving the unreserved portion beneath inventory holder 30 or 32, mobile drive units 20 and/or 22 may move beneath inventory holder 30 or 32. In some embodiments, such techniques may be employed by route planning module 108 to plan paths for mobile drive units 20 and/or 22. A similar technique may be used such that mobile drive units may move beneath inventory holders in order to couple and/or dock with them. Additionally or alternatively, height restriction policies and/or tunneling policies associated with particular objects such as inventory holders 30 and/or 32 may enable similar techniques in embodiments where workspace 74 is represented in two-dimensional space.

Space reservation module 110 may determine that the requested segment is partially reserved and partially unreserved. For example, space reservation module 110 may determine that the unreserved portion comprises a part of segment 17 that another mobile drive unit 20 and/or 22 has recently exited. Space reservation module 110 may partially grant the request of the unreserved portion of the requested segment 17. In some embodiments, mobile drive units 20 and/or 22 may release reservations on a volume segment 17 once those mobile drive units 20 and/or 22 have moved through that space. Space reservation module 110 may grant the additionally released portions of segment 17 as they become available. In some embodiments, however, the entirety of the additionally released portions may not be granted. Space reservation module 110 may determine that granting the additional portion would conflict with a reservation policy. For example, granting the additional portion may conflict with a policy that enforces valid stopping points at fiducial markers and/or ensures minimum distances between mobile drive units. Based on that determination, space reservation module 110 may reduce the additional portion so that the reservation policy may be maintained. Alternatively or additionally, space reservation module 110 may determine the direction of movement of the mobile drive unit that holds the reservation on a requested segment and if the direction of movement of that mobile drive unit is in the same direction as the requesting mobile drive unit, then space reservation module 110 may grant that request. Using such techniques, mobile drive units 20 and/or 22 may move more closely behind other mobile drive units than would otherwise be possible.

In the illustrated example, once mobile drive unit 20a reaches inventory holder 30a, mobile drive unit 20a may move beneath inventory holder 30a and may then couple with inventory holder 30a. Once coupled, mobile drive unit 20a may transmit information identifying that it has coupled with inventory holder 30a. Space reservation module 110 may thus determine that mobile drive unit 20a has coupled with inventory holder 30a. Accordingly, space reservation module 110 may modify the volume segment 200 representing mobile drive unit 20a based on volume segment 300, which represents the physical dimensions of inventory holder 30a. Thus, when mobile drive unit 20a attempts to move or transport inventory holder 30a to another destination, such as inventory station 56, the reservation request will be based on the modified volume segment 304 representing volume segment 200 of mobile drive unit 20 and volume segment 300 of inventory holder 30a.

In some embodiments, mobile drive units 20 and/or 22 may request various types of reservations based on different types of movement. For example, while the illustrated examples demonstrate straight line movements, mobile drive units 20 and/or 22 may be operable to request space sufficient to allow for mobile drive units 20 and/or 22 to rotate inventory holders 30 and/or 32. Accordingly, mobile drive units 20 and/or 22 may be configured to request to reserve a segment 17 that includes space adjacent to the area through which path 16 runs. For example, segment 17 may be defined by a volume resulting from rotating a projection of the volume segment representing the physical dimensions of mobile drive units 20 and/or 22 about an axis of rotation. Similarly, segment 17 may be defined by the two-dimensional footprint resulting from that rotation. Consequently, when a requesting mobile drive unit 20 and/or 22 plans to rotate inventory holder 30 and/or 32 as part of its movement in completing a particular segment 17, the requesting mobile drive unit 20 and/or 22 may attempt to place rotation reservations on the space adjacent to the space in which the mobile drive unit intends to perform the rotation, which is the space corresponding to the space required to rotate the mobile drive unit 20 and/or 22. Accordingly, mobile drive units 20 and/or 22 need only reserve enough space necessary to perform the rotation maneuver, although more space may be reserved as appropriate. Because mobile drive units 20 and/or 22 may only reserve enough space within workspace 75 in which to perform the rotation maneuver, more space is available for other inventory management tasks. This may reduce the number of delays mobile drive units face when attempting to reserve a sufficiently large portion of workspace 74 to rotate inventory holders 30 and/or 32. In such embodiments, a request would be granted based on the determination that the space requested for the rotation maneuver does not intersect with a space reserved by another mobile drive unit or fixed object.

Alternatively or in addition, reservation requests may be made based on workspace cells 76 in a like manner to that which is described above. Accordingly, depending upon the size of inventory holders 30 and/or 32 relative to workspace cells 76 utilized in the relevant workspace 74, the requesting mobile drive unit 20 and/or 22 may not need to use the entire area of each neighboring cell to rotate. As a result, space reservation module 110 may allow other mobile drive units to place reservation requests on a particular neighboring cell at the same time the first requesting mobile drive unit 20 and/or 22 has reserved that particular cell. More specifically, in particular embodiments, space reservation module 110 may allow other mobile drive units 20 and/or 22 to reserve neighboring cells for the purpose of encroaching into that cell while rotating inventory holders 30 and/or 32 that border the neighboring cell.

Thus, although straight segments 17 may be utilized, particular embodiments of inventory management system 10 may be configured to generate paths to include segments covering turns, curves or other non-linear portions. For example, as illustrated, segment 17e includes a curved portion. Additionally, although the illustrated example segment 17 extends without limits, between turns and paths 16, particular embodiments of inventory management system 10 may be configured to generate path 16 that has an upper limit on segment length or allows a maximum segment length to be reserved within a single reservation. In addition, mobile drive units 20 and/or 22 may be capable of requesting new paths while still completing paths to request destinations. In that way, mobile drive units 20 may store multiple tasks to complete, which may include multiple paths and/or multiple destinations. It should be understood however, that while the example embodiments discussed above illustrate examples of inventory management system 10 in which mobile drive units 20 and/or 22 actively request reservations of particular segments 17 on their own behalf, in alternative embodiments, space reservation module 110 or other suitable components of inventory management system 10 may be responsible for initiating reservations. For example, management module 15 may monitor the location and current path of mobile drive units 20 and/or 22 and may reserve appropriate segments 17 on behalf of mobile drive units 20 and/or 22 at appropriate times during the movement of mobile drive units 20.

Consequently, inventory management system 10 supports a number of techniques that provide for efficient routing, navigation, and management of mobile drive units 20 and/or 22 moving within workspace 74. Inventory management system 10 supports techniques for resolving and/or avoiding conflicting requests for a particular segment 17 by two different mobile drive units 20 and/or 22. As a result, mobile drive units 20 and/or 22 may operate within the same workspace 74 to provide for a more efficient use of system resources and inventory management system 10.

Figure 6A:
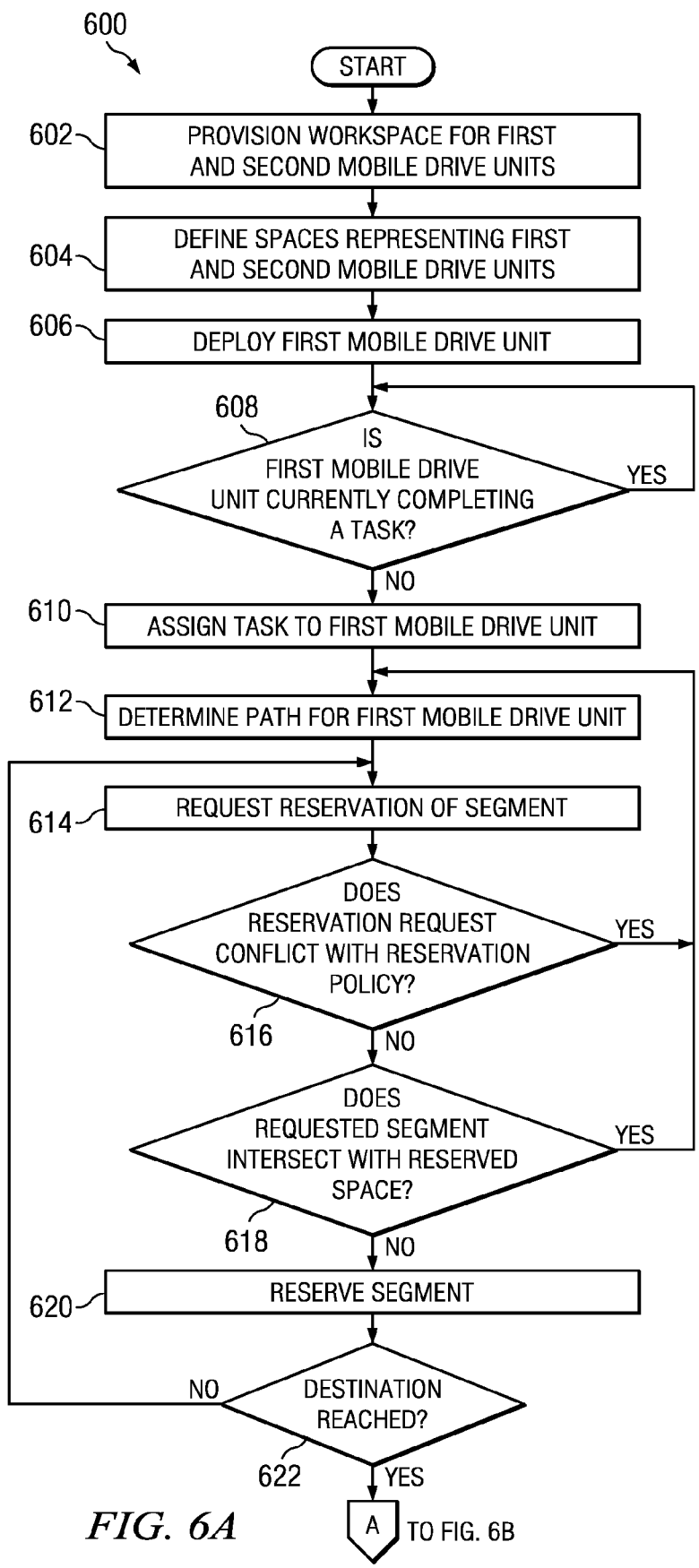
FIGS. 6A and 6B are flowcharts illustrating an example embodiment of a method for inventory management.
Figure 6B:
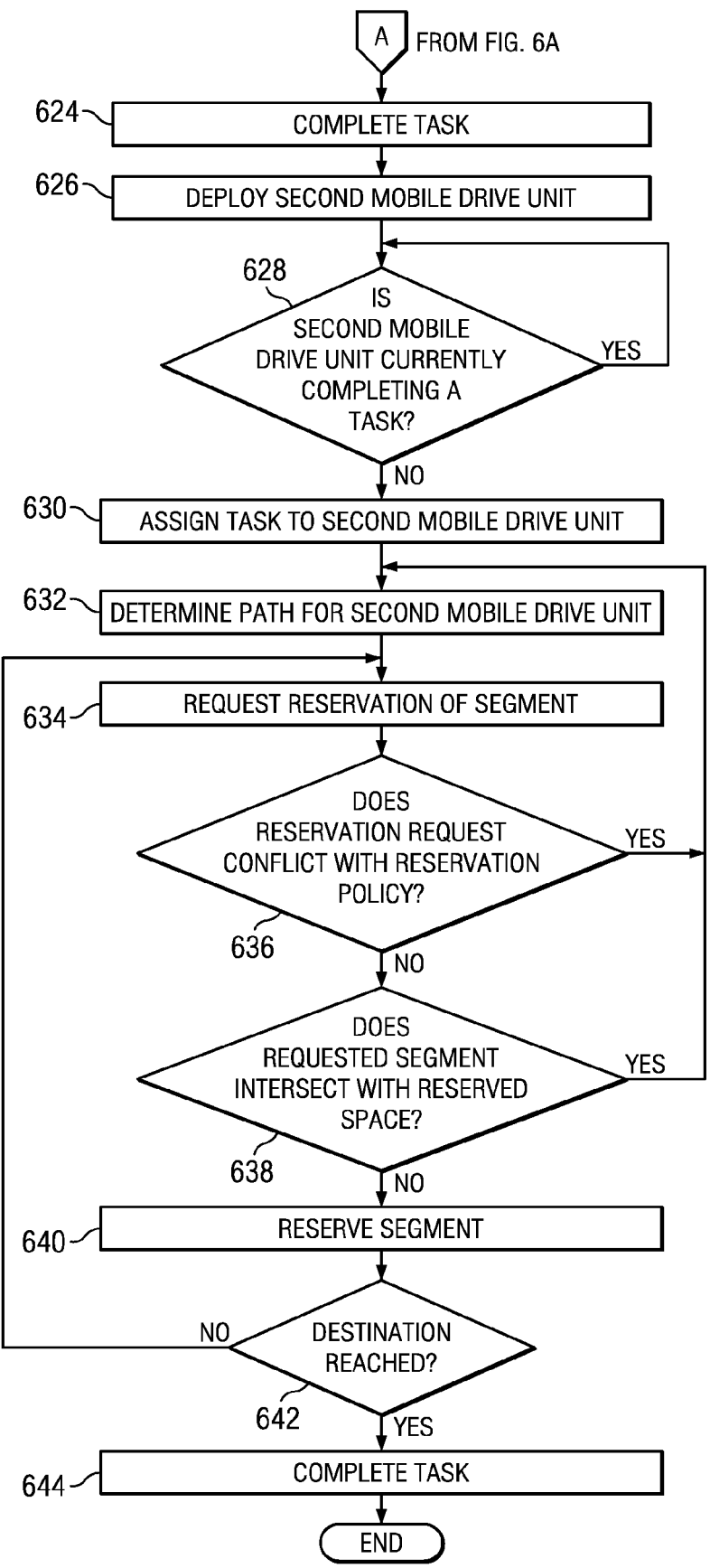

FIGS. 6A and 6B are flowcharts illustrating an example embodiment of a method 600 for inventory management. At step 602, a workspace 74 for first and second mobile drive units is provisioned. For example, multiple inventory holders of various sizes may be distributed into workspace 74, such as inventory holders 30 and/or 32. Various inventory stations 56 may be assigned in which mobile drive units 20 and/or 22 interact. In some embodiments, the provisioning process may include defining a set of workspace volumes 75 describing various three-dimensional characteristics of workspace 74. In addition or in the alternative, the provisioning process may include provisioning a set of workspace cells 76 describing two-dimensional characteristics of workspace 74, such as a map or floor layout.

At step 604, spaces representing the first and second mobile drive units are defined. For example, a three-dimensional volume segment may be defined for mobile drive unit 20 and a second three-dimensional volume segment may be defined for mobile drive unit 22. Each of the volumes is respectively associated with the physical dimensions of mobile drive unit 20 and 22. As another example, footprints representing the two-dimensional projections of the first mobile drive unit and second mobile drive units onto a surface of workspace 74 may be created.

At step 606, the first mobile drive unit 20 is deployed into inventory management system 10. Mobile drive unit 20, for example, may register its location and/or assignment status with management module 15.

At step 608, resource scheduling module 106 determines if first mobile drive unit 20 is currently completing a task. Resource scheduling module 106 may have a task that involves a given inventory holder 30. If first mobile drive unit 20 is currently completing another task, resource scheduling module 106 may determine whether another mobile drive unit 20 is available to complete that task or may wait until the first mobile drive unit 20 is available. If first mobile drive unit 20 is not currently completing a task, resource scheduling module 106 may, at step 610, assign a task to the first mobile drive unit 20.

First mobile drive unit 20 may request a path from management module 15 and, at step 612, route planning module 108 determines a path 16 for first mobile drive unit 20. According to the techniques discussed above, once one or more paths 16 are determined by route planning module 108 and are transmitted to first mobile drive unit 20.

Once first mobile drive unit 20 receives the one or more paths 16, at step 614, first mobile drive unit 20 communicates a reservation request to space reservation module 110. For example, first mobile drive unit 20 may request a volume segment associated with the physical dimensions of first mobile drive unit 20. If first mobile drive unit 20 is coupled and/or docked with an inventory holder 30, space reservation module 110 modifies the volume segment associated with first mobile drive unit 20 based on the physical dimensions of inventory holder 30. As another example, first mobile drive unit 20 may request a segment representing the footprint of first mobile drive unit 20 in two-dimensional space.

At step 616, space reservation module 110 may determine whether the reservation request conflicts with a reservation policy. For example, reservation policies may include any of the policies discussed above. If the requested segment does not conflict with a reservation policy, the method may determine at step 618 whether the requested segment intersects with a reserved space. If either the requested reservation conflicts with a reservation policy or the requested segment has already been reserved by another component, then the method may return to step 612 and route planning module 108 determines a new path 16 for first mobile drive unit 20. In some embodiments, however, space reservation module 110 may first determine whether a lesser portion of the requested segment may be granted. For example, a lesser segment may be granted if the segment allows for some movement of the mobile drive unit 20 in the desired direction. If a lesser portion cannot be granted or the requested segment intersects with a permanent reservation, the method may then return to step 612. If, however, the requested segment intersects with a temporary reservation, space reservation module 110 may wait a predetermined amount of time and attempt to reserve the segment again. Space reservation module 110 may retry a number of times before determining a new path. Additionally or alternatively, space reservation module 110 may request a segment of a second alternative path based on priority.

At step 620, if the requested segment does not intersect with a reserved space and the reservation request does not conflict with a reservation policy, then the space is reserved for first mobile drive unit 20. First mobile drive unit 20 will then move along the reserved segment.

At step 622, if the destination has not been reached, then the method returns to step 614 where a second segment of the path 16 is requested and the method repeats. In some embodiments, first mobile drive unit 20 may request the next segment of path 16 during traversal of the reserved segment, and in some embodiments, may release reservations of the space as first mobile drive unit 20 traverses through it.

Once the destination is reached, then the task is completed at step 624. For example, the task may include docking with an inventory holder 30 at a destination. Once mobile drive unit 20 reaches that destination, it may dock with inventory holder 30 and transmit information to management module 15 indicating the assigned task is complete. Resource scheduling module 106 may then assign a next task to first mobile drive unit 20 and/or first mobile drive unit 20 may attempt to begin a next task stored in first mobile drive unit 20.

Likewise, at step 626, a second mobile drive unit 22 is deployed in a similar manner to first mobile drive unit 20. The second mobile drive unit 22 has a physical dimension different from the first mobile drive unit 20 and is capable of transporting inventory holders 32 having different dimensions than the inventory holders 30 mobile drive unit 20 is capable of transporting in the same workspace.

At step 628, resource scheduling module 106 determines if second mobile drive unit 22 is currently completing a task. Resource scheduling module 106 may have a task that involves a given inventory holder 32. If second mobile drive unit 22 is currently completing another task, resource scheduling module 106 may determine whether another mobile drive unit 22 is available to complete that task or may wait until the second mobile drive unit 22 is available. If second mobile drive unit 22 is not currently completing a task, resource scheduling module 106 may, at step 630, assign a task to second mobile drive unit 22.

Second mobile drive unit 22 may request a path 16 from management module 15 and, at step 632, route planning module 108 determines a path 16 for the second mobile drive unit 22. In some embodiments, path 16 planned for the second mobile drive unit 22 may depend on the other path 16 planned for the first mobile drive unit 20. Additionally or alternatively, the set of reservations in workspace 74 may change from the time the first path 16 is planned for the first mobile drive unit 20 to the time the second path 16 is planned for the second mobile drive unit 22. The planned path 16 may change accordingly. The available paths 16 may also vary according to the physical dimensions of mobile drive unit 22, which may prevent the second mobile drive unit 22 from taking the same routes as a given mobile drive unit 20. According to the techniques discussed above, one or more paths 16 are determined by route planning module 108 and are transmitted to second mobile drive unit 22.

Once second mobile drive unit 22 receives the one or more paths 16, at step 634, second mobile drive unit 22 communicates a reservation request to management module 15. For example, second mobile drive unit 22 may request a volume segment associated with the physical dimensions of second mobile drive unit 22. If second mobile drive unit 22 is coupled and/or docked with an inventory holder 32, management module 15 modifies the volume segment associated with second mobile drive unit 22 based on the physical dimensions of inventory holder 32. As another example, second mobile drive unit 22 may request a segment corresponding to the footprint of mobile drive unit 22 in two-dimensional space.

At step 636, space reservation module 110 may determine whether the reservation request conflicts with a reservation policy. For example, reservation policies may include any of the policies discussed above. If the requested segment does not conflict with a reservation policy, the method may determine at step 638 whether the requested segment intersects with a reserved space. If either the requested reservation conflicts with a reservation policy or the requested segment has already been reserved, then the method may return to step 632 and space reservation module 110 determines a new path for second mobile drive unit 22. In some embodiments, however, space reservation module 110 may first determine whether a lesser portion of the requested segment may be granted. For example, a lesser segment may be granted if the segment allows for some movement of the mobile drive unit 22 in the desired direction. If a lesser portion cannot be granted or the requested segment intersects with a permanent reservation, the method may then return to step 632. If, however, the requested segment intersects with a temporary reservation, space reservation module 110 may wait a predetermined amount of time and attempt to reserve the segment again. Space reservation module 110 may retry a number of times before determining a new path. Additionally or alternatively, space reservation module 110 may request a segment of a second alternative path based on priority.

At step 640, if the requested segment does not intersect with a reserved space and the reservation request does not conflict with a reservation policy, then the space is reserved for the second mobile drive unit 22. Second mobile drive unit 22 will then move along the reserved segment.

At step 642, if the destination has not been reached, then the method returns to step 634 where a second segment of the path is requested and the method repeats. In some embodiments, second mobile drive unit 22 may request the next segment of the path during traversal of the reserved segment, and in some embodiments, may release reservations of the space as second mobile drive unit 22 traverses through it.

Once the destination is reached, then the task is completed at step 644. For example, the task may be to dock with an inventory holder 32 at a destination. Once second mobile drive unit 22 reaches that destination, it may dock with inventory 32 and transmit information to management module 15 indicating the assigned task is complete. Resource scheduling module 106 may then assign a next task to second mobile drive unit 22 and/or second mobile drive unit 22 may attempt to begin a next task stored by second mobile drive unit 22.

It should be noted that while the method 600 illustrates the first and second mobile drive units as being deployed sequentially, the method is fully intended to allow various mobile drive units to operate simultaneously and these steps are illustrated as happening sequentially for a purpose of illustration only. In addition, modifications, additions, or omissions may be made to method 600 illustrated in the flowchart of FIG. 6. For example, method 600 may process several requests for reservations once and/or in parallel. Additionally, the steps of FIG. 6 may be performed in parallel or in any suitable order.

Technical advantages of certain embodiments of the present invention include the ability to deploy a first mobile drive unit having first dimensions and a second mobile drive unit having second dimensions in an inventory management system. In certain embodiments, the first and second mobile drive units may operate within the same workspace. In some embodiments, the first and second mobile drive units may have overlapping or distinct workspaces. Another technical advantage may include transporting inventory holders that have different physical sizes and/or purposes. Accordingly, in some embodiments different-sized mobile drive units may each serve the same inventory station. According to the teachings of the present disclosure, the space and time required to accomplish the same task as compared to a system that does not deploy different-sized mobile drive units may be substantially reduced and certain operational efficiencies realized.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for inventory management, comprising:
deploying a first mobile drive unit having first dimensions in a workspace;
deploying a second mobile drive unit having second dimensions in the workspace, wherein the first and second dimensions are different;
deploying a management module configured to maintain a three-dimensional reservation space in which the first mobile drive unit is operable to reserve a first three-dimensional reservation volume corresponding to the first dimensions and the second mobile drive unit is operable to reserve a second three-dimensional reservation volume corresponding to the second dimensions; and
wherein the first and second mobile drive units are operable to transport inventory items to a plurality of inventory stations in the same workspace.

2. The method of claim 1, further comprising
determining a first path for the first mobile drive unit;
determining a second path for the second mobile drive unit; and
reserving a first segment of the first path, the first segment comprising a first space associated with the first dimensions of the first mobile drive unit.

3. The method of claim 2, wherein the first space comprises one of a volume, a cell, and a footprint.

4. The method of claim 2, further comprising:
receiving a request to reserve a second segment of a second path;
determining whether the requested second segment intersects with a reserved space; and
determining that the requested second segment does not intersect, with the reserved space.

5. The method of claim 2, wherein reserving a first segment further comprises:
determining that the first mobile drive unit is coupled to an inventory holder;
modifying the first space based on the dimensions of the inventory holder; and
reserving a modified first segment comprising the modified first space.

6. The method of claim 2, further comprising:
applying a reservation policy, wherein reserving the first segment is based on determining that the reservation does not conflict with the reservation policy.

7. The method of claim 6, wherein the reservation policy is based on at least one of an inventory holder location, a predetermined number of maximum drives, a predetermined maximum weight, a predetermined maximum speed, and an inventory type.

8. The method of claim 2, wherein reserving a first segment further comprises:
receiving a request to reserve the first segment of the first path, the first segment representing a physical location of an inventory holder;
determining that the first segment does not intersect with the inventory holder; and
after reserving the first segment, moving the first mobile drive unit under the inventory holder.

9. The method of claim 2, wherein reserving a first segment further comprises:
receiving a request to reserve the first segment of the first path;
determining that the requested first segment comprises a partially unreserved portion; and
reserving the partially unreserved portion.

10. The method of claim 1, further comprising:
determining a capability of one of the plurality of inventory stations; and
assigning an order associated with the first and second mobile drive units to the inventory station based on the capability.

11. The method of claim 2, wherein reserving a first segment further comprises:
receiving a request to reserve the first segment of the first path;
determining that the requested first segment comprises a partially reserved portion and a partially unreserved portion;
partially granting the request of the partially unreserved portion;
further determining that an additional portion of the partially reserved portion has become unreserved; and
partially granting the request of the additional portion.

12. The method of claim 11, further comprising:
determining that the additional portion conflicts with a reservation policy; and reducing the additional portion based on the reservation policy.

13. The method of claim 1, wherein the first and second mobile drive units are each operable to transport inventory items to one of the plurality of inventory stations in the same workspace.

14. A system for inventory management comprising:
a first mobile drive unit having first dimensions;
a second mobile drive unit having second dimensions, wherein the first and second dimensions are different;
a management module configured to maintain a three-dimensional reservation space in which the first mobile drive unit is operable to reserve a first three-dimensional reservation volume corresponding to the first dimensions and the second mobile drive unit is operable to reserve a second three-dimensional reservation volume corresponding to the second dimensions; and
a plurality of inventory holders, the first and second mobile drive units each operable to transport at least one of the inventory holders.

15. The system of claim 14, further comprising a management module operable to:
determine a first path for the first mobile drive unit;
determine a second path for the second mobile drive unit; and
reserve a first segment of the first path, the first segment comprising a first space associated with the first dimensions of the first mobile drive unit.

16. The system of claim 15, wherein the first space comprises one of a volume, a cell, and a footprint.

17. The system of claim 15, the management module further operable to:
receive a request to reserve a second segment of a second path;
determine whether the requested second segment intersects with a reserved space; and
determine that the requested second segment does not intersect with the reserved space.

18. The system of claim 15, the management module further operable to:
determine that the first mobile drive unit is coupled to an inventory holder;
modify the first space based on the dimensions of the inventory holder; and
reserve a modified first segment comprising the modified first space.

19. The system of claim 15, the management module further operable to:
apply a reservation policy, wherein reserving the first segment is based on determining that the reservation does not conflict with the reservation policy.

20. The system of claim 19, Wherein the reservation policy is based on at least one of an inventory holder location, a predetermined number of maximum drives, a predetermined maximum weight, a predetermined maximum speed, and an inventory type.

21. The system of claim 15, the management module further operable to:
receive a request to reserve the first segment of the first path, the first segment representing a physical location of an inventory holder;
determine that the first segment does not intersect with the inventory holder; and
wherein after reserving the first segment, the first mobile drive unit moves under the inventory holder.

22. The system of claim 15, the management module further operable to:
receive a request to reserve the first segment of the first path;
determine that the requested first segment comprises a partially unreserved portion; and
reserve the partially unreserved portion.

23. The system of claim 14, further comprising a management module operable to:
determine a capability of one of a plurality of inventory stations; and
assign an order associated with the first and second mobile drive units to the inventory station based on the capability.

24. The system of claim 15, the management module further operable to:
receive a request to reserve the first segment of the first path;
determine that the requested first segment comprises a partially reserved portion and a partially unreserved portion;
partially grant the request of the partially unreserved portion;
further determine that an additional portion of the partially reserved portion has become unreserved; and
partially grant the request of the additional portion.

25. The system of claim 24, the management module further operable to:
determine that the additional portion conflicts with as reservation policy; and
reduce the additional portion based on the reservation policy.

26. The system of claim 14, further comprising a plurality of inventory stations, wherein the first and second mobile drive units are each operable to transport a least one of the plurality of inventory holders to a least one of the plurality of inventory stations.

27. The system of claim 26, wherein the plurality of inventory stations comprise:
a plurality of first inventory stations operable to interact with inventory items from the first mobile drive units;
a plurality of second inventory stations operable to interact with inventory items from the second mobile drive units; and
a plurality of third inventory stations operable to interact with inventory items from the first and second mobile drive units.

28. The system of claim 14, wherein the plurality of inventory holders comprise:
a plurality of first inventory holders having third dimensions;
a plurality of second inventory holders having fourth dimensions, wherein the third and fourth dimensions are different;
the first mobile drive unit is further operable to transport the plurality of first inventory holders; and
the second mobile drive unit is further operable to transport the plurality of second inventory holders.

29. The system of claim 28, wherein the first mobile drive unit is further operable to transport the second inventory holders.

30. The system of claim 28, wherein the second mobile drive unit is further operable to transport the first inventory holders.

31. A management module comprising logic encoded in a non-transitory medium and when executed by a processor operable to:
facilitate management of a first mobile drive unit having first dimensions in an inventory management system;

facilitate management of a second mobile drive unit having second dimensions in the inventory management system, wherein the first and second dimensions are different; and maintain a three-dimensional reservation space in which the first mobile drive unit is operable to reserve a first three-dimensional reservation volume corresponding to the first dimensions and the second mobile drive unit is operable to reserve a second three-dimensional reservation volume corresponding to the second dimensions; and wherein the first and second mobile drive units are operable to transport inventory items to a plurality of inventory stations in the inventory management system.

32. The management module of claim 31, further operable to:

determine a first path for the first mobile drive unit;

determine a second path for the second mobile drive unit; and reserve a first segment of the first path, the first segment comprising a first space associated with the first dimensions of the first mobile drive unit.

33. The management module of claim 32, wherein the first space comprises one of a volume, a cell, and a footprint.

34. The management module of claim 32, further operable to:

receive a request to reserve a second segment of a second path;

determine whether the requested second segment intersects with a reserved space; and determine that the requested second segment does not intersect with the reserved space.

35. The management module of claim 32, further operable to:

determine that the first mobile drive unit is coupled to an inventory holder;

modify the first space based on the dimensions of the inventory holder; and reserve a modified first segment comprising the modified first space.

36. The management module of claim 32, further operable to:

apply a reservation policy, wherein reserving the first segment is based on determining that the reservation does not conflict with the reservation policy.

37. The management module of claim 36, wherein the reservation policy is based on at least one of an inventory holder location, a predetermined number of maximum drives, a predetermined maximum weight, a predetermined maximum speed, and an inventory type.

38. The management module of claim 32, further operable to:

receive a request to reserve the first segment of the first path, the first segment representing a physical location of an inventory holder;

determine that the first segment does not intersect with the inventory holder; and wherein after reserving the first segment, the first mobile drive unit moves under the inventory holder.

39. The management module of claim 32, further operable to:

receive a request to reserve the first segment of the first path;

determine that the requested first segment comprises a partially reserved portion and a partially unreserved portion; and partially grant the request of the partially unreserved portion.

40. The management module of claim 31, further operable to:

determine a capability of one of the plurality of inventory stations; and assign an order associated with the first and second mobile drive units to the inventory station based on the capability.

41. The management module of claim 32, further operable to:

receive a request to reserve the first segment of the first path;

determine that the requested first segment comprises a partially reserved portion and a partially unreserved portion;

partially grant the request of the partially unreserved portion;

further determine that an additional portion of the partially reserved portion has become unreserved; and partially grant the request of the additional portion.

42. The management module of claim 41, further operable to:

determine that the additional portion conflicts with a reservation policy; and reduce the additional portion based on the reservation policy.

* * * * *

UNITED STATES PATENT AND TRADEMARK OFFICE
CERTIFICATE OF CORRECTION

| | | |
|---|---|---|
| PATENT NO. | : 8,831,984 B2 | Page 1 of 1 |
| APPLICATION NO. | : 13/276990 | |
| DATED | : September 9, 2014 | |
| INVENTOR(S) | : Andrew E. Hoffman et al. | |

It is certified that error appears in the above-identified patent and that said Letters Patent is hereby corrected as shown below:

In the claims:

Column 24, Line 12: After "intersect" and before "with the reserved" delete ",".

Column 25, Line 52: After "claim 19" and before "the reservation policy" delete "Wherein" and insert -- wherein --.

Column 26, Line 27: After "conflicts with" and before "reservation" delete "as" and insert -- a --.

Signed and Sealed this
Twentieth Day of January, 2015

Michelle K. Lee
*Deputy Director of the United States Patent and Trademark Office*